United States Patent
Caseiro et al.

(10) Patent No.: US 10,134,394 B2
(45) Date of Patent: Nov. 20, 2018

(54) SPEECH RECOGNITION USING LOG-LINEAR MODEL

(71) Applicant: GOOGLE LLC, Mountain View, CA (US)

(72) Inventors: Diamantino Antonio Caseiro, Philadelphia, PA (US); Fadi Biadsy, New York, NY (US)

(73) Assignee: Google LLC, Mountain View, CA (US)

( * ) Notice: Subject to any disclaimer, the term of this patent is extended or adjusted under 35 U.S.C. 154(b) by 94 days.

(21) Appl. No.: 14/708,465

(22) Filed: May 11, 2015

(65) Prior Publication Data

US 2016/0275946 A1 Sep. 22, 2016

Related U.S. Application Data

(60) Provisional application No. 62/136,083, filed on Mar. 20, 2015.

(51) Int. Cl.
*G10L 15/197* (2013.01)
*G06F 17/27* (2006.01)

(52) U.S. Cl.
CPC ........ *G10L 15/197* (2013.01); *G06F 17/2715* (2013.01)

(58) Field of Classification Search
CPC ........... G06F 17/30746; G06F 17/2715; G10L 15/197
(Continued)

(56) References Cited

U.S. PATENT DOCUMENTS 4,820,059 A   4/1989 Miller et al.
5,267,345 A   11/1993 Brown et al.
(Continued)

FOREIGN PATENT DOCUMENTS

DE   10045020   5/2001
EP   2383663    9/2005
(Continued)

OTHER PUBLICATIONS

Tsuruoka, et al., "Stochastic Gradient Descent Training for L1-regularized Log-linear Models with Cumulative Penalty", Retrieved at <<http://www.aclweb.org/anthology/P/P09/P09-1054.pdf>>, Proceedings of the 47th Annual Meeting of the ACL and the 4th IJCNLP of the AFNLP, Aug. 2-7, 2009, pp. 477-485.*
(Continued)

*Primary Examiner* — Tammy Paige Goddard
*Assistant Examiner* — Bharatkumar S Shah
(74) *Attorney, Agent, or Firm* — Fish & Richardson P.C.

(57) ABSTRACT

Methods, systems, and apparatus, including computer programs encoded on a computer storage medium, relating to generating log-linear models. In some implementations, n-gram parameter values derived from an n-gram language model are obtained. N-gram features for a log-linear language model are determined based on the n-grams corresponding to the obtained n-gram parameter values. A weight for each of the determined n-gram features is determined, where the weight is determined based on (i) an n-gram parameter value that is derived from the n-gram language model and that corresponds to a particular n-gram, and (ii) an n-gram parameter value that is derived from the n-gram language model and that corresponds to an n-gram that is a sub-sequence within the particular n-gram. A log-linear language model having the determined n-gram features is generated, where the determined n-gram features in the log-linear language model have weights that are initialized based on the determined weights.

20 Claims, 5 Drawing Sheets

(58) Field of Classification Search
USPC .......................................................... 704/235
See application file for complete search history.

(56) References Cited

U.S. PATENT DOCUMENTS

| | | | |
|---|---|---|---|
| 5,632,002 A | 5/1997 | Hashimoto et al. | |
| 5,638,487 A | 6/1997 | Chigier | |
| 5,715,367 A | 2/1998 | Gillick et al. | |
| 5,737,724 A | 4/1998 | Atal et al. | |
| 5,768,603 A | 6/1998 | Brown et al. | |
| 5,805,832 A | 9/1998 | Brown et al. | |
| 5,822,730 A | 10/1998 | Roth et al. | |
| 6,021,403 A | 2/2000 | Horvitz et al. | |
| 6,119,186 A | 9/2000 | Watts et al. | |
| 6,167,377 A | 12/2000 | Gillick et al. | |
| 6,182,038 B1 | 1/2001 | Balakrishnan et al. | |
| 6,317,712 B1 | 11/2001 | Kao et al. | |
| 6,397,180 B1 | 5/2002 | Jaramillo et al. | |
| 6,418,431 B1 | 7/2002 | Mahajan et al. | |
| 6,446,041 B1 | 9/2002 | Reynar et al. | |
| 6,539,358 B1 | 3/2003 | Coon et al. | |
| 6,581,033 B1 | 6/2003 | Reynar et al. | |
| 6,678,415 B1 | 1/2004 | Popat et al. | |
| 6,714,778 B2 | 3/2004 | Nykänen et al. | |
| 6,778,959 B1 | 8/2004 | Wu et al. | |
| 6,839,670 B1 | 1/2005 | Stammler et al. | |
| 6,876,966 B1 | 4/2005 | Deng et al. | |
| 6,912,499 B1 | 6/2005 | Sabourin et al. | |
| 6,922,669 B2 | 7/2005 | Schalk et al. | |
| 6,950,796 B2 | 9/2005 | Ma et al. | |
| 6,959,276 B2 | 10/2005 | Droppo et al. | |
| 7,027,987 B1 | 4/2006 | Franz et al. | |
| 7,043,422 B2 | 5/2006 | Gao et al. | |
| 7,149,688 B2 | 12/2006 | Schalkwyk | |
| 7,149,970 B1 | 12/2006 | Pratley et al. | |
| 7,174,288 B2 | 2/2007 | Ju et al. | |
| 7,200,550 B2 | 4/2007 | Menezes et al. | |
| 7,257,532 B2 | 8/2007 | Toyama | |
| 7,310,601 B2 | 12/2007 | Nishizaki et al. | |
| 7,366,668 B1 | 4/2008 | Franz et al. | |
| 7,370,275 B2 | 5/2008 | Haluptzok et al. | |
| 7,383,553 B2 | 6/2008 | Atkin et al. | |
| 7,392,188 B2 | 6/2008 | Junkawitsch et al. | |
| 7,403,888 B1 | 7/2008 | Wang et al. | |
| 7,424,426 B2 | 9/2008 | Furui et al. | |
| 7,424,428 B2 | 9/2008 | Rose et al. | |
| 7,451,085 B2 | 11/2008 | Rose et al. | |
| 7,505,894 B2 | 3/2009 | Menezes et al. | |
| 7,526,431 B2 | 4/2009 | Roth et al. | |
| 7,577,562 B2 | 8/2009 | Menezes et al. | |
| 7,599,893 B2 | 10/2009 | Sapir et al. | |
| 7,634,720 B2 | 12/2009 | Haluptzok et al. | |
| 7,672,833 B2 | 3/2010 | Blume et al. | |
| 7,698,124 B2 | 4/2010 | Menezes et al. | |
| 7,698,136 B1 | 4/2010 | Nguyen et al. | |
| 7,752,046 B2 | 7/2010 | Bacchiani et al. | |
| 7,778,816 B2 | 8/2010 | Reynar | |
| 7,805,299 B2 | 9/2010 | Coifman | |
| 7,831,427 B2 | 11/2010 | Potter et al. | |
| 7,848,927 B2 | 12/2010 | Ohno et al. | |
| 7,881,936 B2 | 2/2011 | Longé et al. | |
| 7,890,326 B2 | 2/2011 | Strope et al. | |
| 7,907,705 B1 | 3/2011 | Huff et al. | |
| 7,941,189 B2 | 5/2011 | Miyauchi | |
| 7,953,692 B2 | 5/2011 | Bower et al. | |
| 7,996,220 B2 | 8/2011 | Rose et al. | |
| 8,001,130 B2 | 8/2011 | Wen et al. | |
| 8,005,680 B2 | 8/2011 | Kommer | |
| 8,009,678 B2 | 8/2011 | Brooke | |
| 8,027,973 B2 | 9/2011 | Cao et al. | |
| 8,060,373 B2 | 11/2011 | Gibbon et al. | |
| 8,069,027 B2 | 11/2011 | Liu et al. | |
| 8,069,043 B2 | 11/2011 | Bacchiani et al. | |
| 8,296,142 B2 | 10/2012 | Lloyd et al. | |
| 8,352,245 B1 | 1/2013 | Lloyd | |
| 8,352,246 B1 | 1/2013 | Lloyd | |
| 8,473,289 B2 | 6/2013 | Jitkoff et al. | |
| 8,521,526 B1 | 8/2013 | Lloyd et al. | |
| 8,532,994 B2 | 9/2013 | Malegaonkar et al. | |
| 8,583,416 B2 | 11/2013 | Huang et al. | |
| 8,798,984 B2 | 8/2014 | Cancedda et al. | |
| 2002/0062216 A1 | 5/2002 | Guenther et al. | |
| 2002/0078091 A1 | 6/2002 | Vu et al. | |
| 2002/0087309 A1 | 7/2002 | Lee et al. | |
| 2002/0087314 A1 | 7/2002 | Fischer et al. | |
| 2002/0111990 A1 | 8/2002 | Wood et al. | |
| 2002/0165714 A1 | 11/2002 | Beyerlein | |
| 2003/0050778 A1 | 3/2003 | Nguyen et al. | |
| 2003/0149561 A1 | 8/2003 | Zhou | |
| 2003/0216919 A1 | 11/2003 | Roushar | |
| 2003/0236099 A1 | 12/2003 | Deisher et al. | |
| 2004/0024583 A1 | 2/2004 | Freeman | |
| 2004/0043758 A1 | 3/2004 | Sorvari et al. | |
| 2004/0049388 A1 | 3/2004 | Roth et al. | |
| 2004/0098571 A1 | 5/2004 | Falcon | |
| 2004/0138882 A1 | 7/2004 | Miyazawa | |
| 2004/0172258 A1 | 9/2004 | Dominach et al. | |
| 2004/0230420 A1 | 11/2004 | Kadambe et al. | |
| 2004/0243415 A1 | 12/2004 | Commarford et al. | |
| 2005/0005240 A1 | 1/2005 | Reynar et al. | |
| 2005/0108017 A1 | 5/2005 | Esser et al. | |
| 2005/0114474 A1 | 5/2005 | Anderson et al. | |
| 2005/0187763 A1 | 8/2005 | Arun | |
| 2005/0193144 A1 | 9/2005 | Hassan et al. | |
| 2005/0216273 A1 | 9/2005 | Reding et al. | |
| 2005/0246325 A1 | 11/2005 | Pettinati et al. | |
| 2005/0283364 A1 | 12/2005 | Longe et al. | |
| 2006/0004572 A1 | 1/2006 | Ju et al. | |
| 2006/0004850 A1 | 1/2006 | Chowdhury | |
| 2006/0009974 A1 | 1/2006 | Junqua et al. | |
| 2006/0035632 A1 | 2/2006 | Sorvari et al. | |
| 2006/0053015 A1* | 3/2006 | Lai | G10L 15/06 704/257 |
| 2006/0095248 A1 | 5/2006 | Menezes et al. | |
| 2006/0111891 A1 | 5/2006 | Menezes et al. | |
| 2006/0111892 A1 | 5/2006 | Menezes et al. | |
| 2006/0111896 A1 | 5/2006 | Menezes et al. | |
| 2006/0212288 A1 | 9/2006 | Sethy et al. | |
| 2006/0247915 A1 | 11/2006 | Bradford et al. | |
| 2007/0060114 A1 | 3/2007 | Ramer et al. | |
| 2007/0174040 A1 | 7/2007 | Liu et al. | |
| 2008/0027723 A1 | 1/2008 | Reding et al. | |
| 2008/0091406 A1 | 4/2008 | Baldwin et al. | |
| 2008/0091435 A1 | 4/2008 | Strope et al. | |
| 2008/0091443 A1 | 4/2008 | Strope et al. | |
| 2008/0131851 A1 | 6/2008 | Kanevsky et al. | |
| 2008/0133228 A1 | 6/2008 | Rao | |
| 2008/0162117 A1 | 7/2008 | Bangalore et al. | |
| 2008/0188271 A1 | 8/2008 | Miyauchi | |
| 2008/0221887 A1 | 9/2008 | Rose et al. | |
| 2008/0221902 A1 | 9/2008 | Cerra et al. | |
| 2008/0243481 A1* | 10/2008 | Brants | G06F 17/2818 704/9 |
| 2008/0301112 A1 | 12/2008 | Wu | |
| 2009/0030687 A1 | 1/2009 | Cerra et al. | |
| 2009/0030696 A1 | 1/2009 | Cerra et al. | |
| 2009/0083023 A1 | 3/2009 | Foster et al. | |
| 2009/0150160 A1 | 6/2009 | Mozer | |
| 2009/0164216 A1 | 6/2009 | Chengalvarayan et al. | |
| 2009/0192781 A1* | 7/2009 | Bangalore | G06F 17/2827 704/2 |
| 2009/0210214 A1 | 8/2009 | Qian et al. | |
| 2009/0271177 A1 | 10/2009 | Menezes et al. | |
| 2009/0271188 A1 | 10/2009 | Agapi et al. | |
| 2009/0287681 A1 | 11/2009 | Paek et al. | |
| 2009/0292529 A1 | 11/2009 | Bangalore et al. | |
| 2010/0004930 A1 | 1/2010 | Strope et al. | |
| 2010/0049502 A1 | 2/2010 | Oppenheim et al. | |
| 2010/0088303 A1 | 4/2010 | Chen et al. | |
| 2010/0100377 A1 | 4/2010 | Madhavapeddi et al. | |
| 2010/0153219 A1 | 6/2010 | Mei et al. | |
| 2010/0169094 A1* | 7/2010 | Akamine | G10L 15/07 704/244 |
| 2010/0179803 A1 | 7/2010 | Sawaf et al. | |

(56) References Cited

U.S. PATENT DOCUMENTS

| | | |
|---|---|---|
| 2010/0191685 A1 | 7/2010 | Sapir et al. |
| 2010/0254521 A1 | 10/2010 | Kriese et al. |
| 2010/0318531 A1 | 12/2010 | Gao et al. |
| 2010/0325109 A1 | 12/2010 | Bai et al. |
| 2011/0004462 A1 | 1/2011 | Houghton et al. |
| 2011/0066577 A1 | 3/2011 | Van Gael et al. |
| 2011/0077943 A1 | 3/2011 | Miki et al. |
| 2011/0093265 A1 | 4/2011 | Stent et al. |
| 2011/0137653 A1 | 6/2011 | Ljolje et al. |
| 2011/0144992 A1 | 6/2011 | Toutanova et al. |
| 2011/0162035 A1 | 6/2011 | King et al. |
| 2011/0231183 A1 | 9/2011 | Yamamoto et al. |
| 2011/0257974 A1 | 10/2011 | Kristjansson et al. |
| 2011/0288868 A1 | 11/2011 | Lloyd et al. |
| 2011/0295590 A1 | 12/2011 | Lloyd et al. |
| 2012/0084235 A1 | 4/2012 | Suzuki et al. |
| 2012/0316862 A1 | 12/2012 | Sultan et al. |
| 2012/0316877 A1 | 12/2012 | Zweig et al. |
| 2013/0110491 A1 | 5/2013 | He et al. |
| 2013/0346059 A1 | 12/2013 | Brants et al. |
| 2014/0200878 A1 | 7/2014 | Mylonakis et al. |

FOREIGN PATENT DOCUMENTS

| | | |
|---|---|---|
| WO | 1999031654 | 6/1999 |
| WO | 2002073331 | 9/2002 |
| WO | 2002096070 | 11/2002 |
| WO | 2010085773 | 7/2010 |
| WO | 2012170817 | 12/2012 |
| WO | 2013083132 | 6/2013 |
| WO | 2013192218 | 12/2013 |

OTHER PUBLICATIONS

Tsuruoka Yoshimasa (stochastic gradient Descent training for LI-regularized Log-Linear Model with Cumulative penalty Aug. 2-7, 2009.*

Authorized Officer B. R. Copenheaver. International Search Report and Written Opinion in International Application No. PCT/US2011/046629, dated Dec. 9, 2011, 14 pages.

Authorized Officer H. Van Doremalen. International Search Report and Written Opinion in International Application No. PCT/US2012/021221, dated Apr. 5, 2012, 11 pages.

Authorized Officer I. Barabasz. International Search Report and Written Opinion in International Application No. PCT/US2011/036984, dated Aug. 31, 2011, 13 pages.

Authorized Officer R. Poquet. International Search Report and Written Opinion in International Application No. PCT/US2011/029407, dated Jun. 7, 2011, 10 pages.

Authorized Officer R. Poquet. International Search Report and Written Opinion in International Application No. PCT/US2011/037558, dated Jul. 29, 2011, 11 pages.

Biadsy et al., "Backoff Inspired Features for Maximum Entropy Language Models", Proceedings of Interspeech, 2014, 5 pages.

Bocchieri et al., "Use of geographical meta-data in ASR language and acoustic models", Acoustics Speech and Signal Processing (ICASSP), 2010 IEEE International Conference on IEEE, Mar. 14, 2010, pp. 5118-5121.

Brants et al., "Large Language Models in Machine Translation", Proceedings of the 2007 Joint Conference on Empirical Methods in Natural Language Processing and Computational Natural Language Learning, Prague, Jun. 2007, 10 pages.

Chen "Performance Prediction for Exponential Language Models", Technical Report RC 24671, IBM Research Division, 2008, 53 pages.

Collins, "Log-Linear Models," retrieved on Feb. 10, 2014. Retrieved from the internet: URL<http://www.cs.columbia.edu/~mcollins/loglinear.pdf> 20 pages.

Dhillon. 2001. Co-clustering documents and words using bipartite spectral graph partitioning. In: Proceedings of the seventh ACM SIGKDD international conference on Knowledge discovery and data mining, (KDD '01). ACM, New York, NY, USA, 269-274. http://doi.acm.org/10.1145/502512.502550.

Extended European Search Report, Application No. EP 10 165 480.4, dated Oct. 24, 2011, 9 pages.

Frey et al., "ALGONQUIN: Iterating Laplace's Method to Remove Multiple Types of Acoustic Distortion for Robust Speech Recognition", EUROSPEECH 2001 Scandinavia, 7th European Conference on Speech Communication and Technology, Aalborg, Denmark, Sep. 3-7, 2001, [online]. research.microsoft.com [retrieved on Nov. 23, 2010]. Retrieved from the Internet: <URL: http://research.microsoft.com/pubs/76516/2001-frey-eurospeech.pdf>. 4 pages.

Kristjansson et al., "Super-Human Multi-Talker Speech Recognition: The IBM 2006 Speech Separation Challenge System", INTERSPEECH 2006: ICSLP; Proceedings of the Ninth International Conference on Spoken Language Process, Sep. 17-21, 2006, Pittsburgh, Pennsylvania, USA, Bonn, ISCA, 2006, 4 pages.

Lee et al. Search Result Clustering Using Label Language Model. IJCNLP 2008, The Third International Joint Conference on Natural Language Processing. Jan. 7-12, 2008, Hyderabad, India.

Liu and Croft, "Cluster-based retrieval using language models," In: Proceedings of the 27th annual international ACM SIGIR conference on Research and development in information retrieval, (SIGIR '04), 2004, ACM, New York, NY, USA, 186-193. http://doi.acm.org/10.1145/1008992.1009026.

Mohri et al. Weighted Finite-State Transducers in Speech Recognition, Computer Speech & Language, vol. 16, Issue 1, Jan. 2002, pp. 69-88.

Pietra et al., "Adaptive Language Modeling Using Minimum Discriminant Estimation", paper submitted to the ICASSP92 Proceedings, 1992, 4 pages.

United States Office Action in U.S. Appl. No. 13/249,172, dated Dec. 29, 2011, 17 pages.

United States Office Action in U.S. Appl. No. 12/782,862, dated Nov. 30, 2011, 24 pages.

United States Office Action in U.S. Appl. No. 12/787,568, dated Nov. 22, 2011, 16 pages.

United States Office Action in U.S. Appl. No. 13/249,181, dated Dec. 23, 2011, 23 pages.

United States Notice of Allowance in U.S. Appl. No. 13/250,496, dated Sep. 26, 2012, 10 pages.

United States Office Action in U.S. Appl. No. 13/250,496, dated Dec. 13, 2011, 10 pages.

United States Office Action in U.S. Appl. No. 13/250,496, dated May 29, 2012, 18 pages.

United States Office Action in U.S. Appl. No. 13/077,106, dated Jun. 6, 2012, 20 pages.

United States Office Notice of Allowance in U.S. Appl. No. 13/077,106, dated Sep. 21, 2012, 9 pages.

United States Office Supplemental Notice of Allowance in U.S. Appl. No. 13/077,106, dated Nov. 7, 2012, 3 pages.

United States Office Action in U.S. Appl. No. 12/976,920, dated Jan. 20, 2012, 17 pages.

United States Office Action in U.S. Appl. No. 13/249,175, dated Jan. 10, 2012, 17 pages.

United States Office Action in U.S. Appl. No. 13/249,180, dated Dec. 27, 2011, 12 pages.

United States Notice of Allowance in U.S. Appl. No. 13/040,553, dated May 23, 2012, 14 pages.

United States Notice of Allowance in U.S. Appl. No. 13/040,553, dated Aug. 23, 2012, 13 pages.

United States Notice of Allowance in U.S. Appl. No. 13/250,466, dated Nov. 9, 2012, 23 pages.

United States Office Action in U.S. Appl. No. 13/040,553, dated Jan. 10, 2012, 23 pages.

United States Office Action in U.S. Appl. No. 13/250,466, dated Jun. 5, 2012, 23 pages.

United States Office Action in U.S. Appl. No. 12/760,147, dated Nov. 23, 2011, 13 pages.

Vertanen, "An Overview of Discriminative Training for Speech Recognition," Technical Report, 2004, from http://www.inference.phy.cam.ac.uk/kv227/papers/Discriminative_Training.pdf, 14 pages.

(56) References Cited

OTHER PUBLICATIONS

Wikipedia.com, "Gradient descent," Jan. 7, 2014 [retrieved on Feb. 10, 2014]. Retrieved from the internet: URL< http://en.wikipedia.org/wiki/Gradient_descent>. 8 pages.

Wikipedia.com, "Language Model," Dec. 22, 2013, [retrieved on Feb. 10, 2014]. Retrieved from the internet: URL< http://en.wikipedia.org/wiki/Language_model>. 3 pages.

Wikipedia.com, "Log-linear model," Apr. 6, 2013 [retrieved on Feb. 10, 2014]. Retrieved from the internet: URL< http://en.wikipedia.org/wiki/Log-linear_model>. 1 page.

Wu, "Maximum Entropy Language Modeling with Non-Local Dependencies", dissertation submitted to the Johns Hopkins University in conformity with the requirements for the degree of Doctor of Philosophy, Baltimore, Maryland, 2002, 227 pages.

Xu et al. 2007. Using social annotations to improve language model for information retrieval. In: Proceedings of the sixteenth ACM conference on Conference on information and knowledge management, (CIKM '07). ACM, New York, NY, USA, 1003-1006. http://doi.acm.org/10.1145.

Zha et al. Bipartite graph partitioning and data clustering. In Proceedings of the tenth international conference on Information and knowledge management (CIKM '01), Henrique Paques, Ling Liu, and David Grossman (Eds.). 2001, ACM, New York, NY, USA, 25-32.

Zweig et al., "Structured Models for Joint Decoding of Repeated Utterances", INTERSPEECH 2008, 9th Annual Conference of the International Speech Communication Association, Brisbane, Australia, Sep. 22-26, 2008, 4 pages.

Zweig, "New Methods for the Analysis of Repeated Utterances", INTERSPEECH 2009, 10th Annual Conference of the International Speech Communication Association, Brighton, United Kingdom, Sep. 6-10, 2009, 4 pages.

\* cited by examiner

SPEECH RECOGNITION USING LOG-LINEAR MODEL

CROSS-REFERENCE TO RELATED APPLICATION

This application claims the benefit of U.S. Provisional Application Ser. No. 62/136,083, filed on Mar. 20, 2015, which is incorporated by reference.

TECHNICAL FIELD

This specification generally relates to speech recognition systems.

BACKGROUND

The use of speech recognition is becoming more and more common. As technology has advanced, users of computing devices have gained increased access to speech recognition functionality. Many users rely on speech recognition in their professions and in other aspects of daily life.

SUMMARY

An n-gram language model may be trained using a corpus of training data to indicate likelihoods of word sequences. The n-gram model may be used to recognize utterances spoken by users of a speech recognition system. A log-linear language model may be used in the speech recognition system as an alternative to the n-gram language model, and doing so can provide various advantages. However, training log-linear language models on a large amount of training data, using convex optimization methods, is known to be computationally expensive. In some implementations, a model-transformation technique for initializing a log-linear language model given an already trained backoff n-gram model may be used to speed up training and to improve the perplexity on a held out test set. For example, a log-linear model may be trained based on the n-gram parameters of the n-gram model to yield performance that is as good as or superior to the n-gram model. Moreover, additional linguistic and/or non-linguistic features may be defined in the log-linear model to further improve the performance of the log-linear model.

In general, one innovative aspect of the subject matter described in this specification can be embodied in methods that include the actions of obtaining an n-gram language model that includes parameter values for n-grams that each include multiple words; determining a set of features for a log-linear model based on the n-grams that comprise multiple words and that have parameter values in the n-gram language model; determining a weight for each feature in the determined set of features, where each of the weights is respectively determined based on (i) a parameter value in the n-gram language model for a particular n-gram of multiple words, and (ii) a parameter value in the n-gram language model for an n-gram that is a sub-sequence within the particular n-gram; generating a log-linear language model that has the features in the determined set of features, the features having weights in the log-linear language model that are initialized based on the determined weights; using the log-linear language model to determine a transcription for an utterance; and providing the transcription for the utterance.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Implementations may include one or more of the following features. For example, the n-gram language model may be configured to assign, to an n-gram that does not have a corresponding parameter value in the n-gram language model, a score based on a parameter value in the n-gram language model for a sub-sequence of words within the n-gram. For each of the n-grams that includes multiple words, the corresponding parameter value may indicate a conditional probability of an occurrence of a last word in the n-gram given an occurrence of one or more words that precede the last word in the n-gram.

To generate the log-linear language model, the log-linear language model may be generated to indicate, for one or more n-grams, likelihoods of occurrence that equal to likelihoods of occurrence indicated by the n-gram language model for the one or more n-grams. To determine the n-gram features for the log-linear language model, for each n-gram parameter value in the n-gram language model, an n-gram feature that represents an occurrence of a particular word in a particular context including one or more words may be determined.

To determine the n-gram features for the log-linear language model, each of the n-grams corresponding to the n-gram parameter values derived from the n-gram language model may be identified, the n-gram features may be determined to include a feature corresponding to each identified n-gram.

Backoff parameter values derived from the n-gram language model may be obtained, the backoff parameter values representing n-gram backoffs from one order of n-gram to a lower order of n-gram. Backoff features for the log-linear language model that represent the backoffs of the n-grams in the n-gram language model may be determined. A weight for each backoff feature in the determined backoff features may be determined, where each of the weights for the determined backoff features may be respectively determined based on a backoff parameter value derived from the n-gram language model. To generate the log-linear language model, the log-linear language model may be generated to have the backoff features and corresponding weights that are initialized based on the determined weights for the backoff features. The weights for the backoff features in the log-linear language model may each represent a probability adjustment equivalent to the adjustment represented by a corresponding backoff parameter value in the n-gram language model. To generate the log-linear language model, the weights for the backoff features may be re-trained based on the determined weights for the backoff features.

To determine the weight for each n-gram feature, for at least some of the weights, a backoff parameter value from the n-gram language model may be incorporated in the weight determination. The log-linear language model may include non-linguistic features corresponding to one or more aspects of non-linguistic context, the non-linguistic features including features indicative of a user characteristic, a time, a geographic location, an application, or an input field.

After generating the log-linear language model, the log-linear language model may be trained to adjust the weights.

To train the log-linear language model, the log-linear language model may be trained using stochastic gradient descent training and using a set of training data that is different from a set of training data used to train the n-gram language model.

Advantageous implementations may include one or more of the following features. Training a log-linear model using n-gram parameters from an n-gram model can produce a log-linear model that is at least as accurate as the n-gram model. The training of a log-linear model can be faster because the training of n-gram features derived from an n-gram model is often faster than the training of n-gram features from scratch. In addition to n-gram features, other linguistic or non-linguistic features can be added to a log-linear model to further improve the performance of the log-linear model. A log-linear model converted from a backoff n-gram model may perform better with uncommon phrases (e.g., potential language sequences at the tail of a probability distribution) when compared to traditional training. Using explicit backoff features in the log-linear model provides flexibility and better performance because the log-linear model may be iteratively trained to provide better backoff features. Using implicit backoff features in the log-linear model can provide a reduced model size because the log-linear model does not need to include weights for backoff features corresponding to n-gram features.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
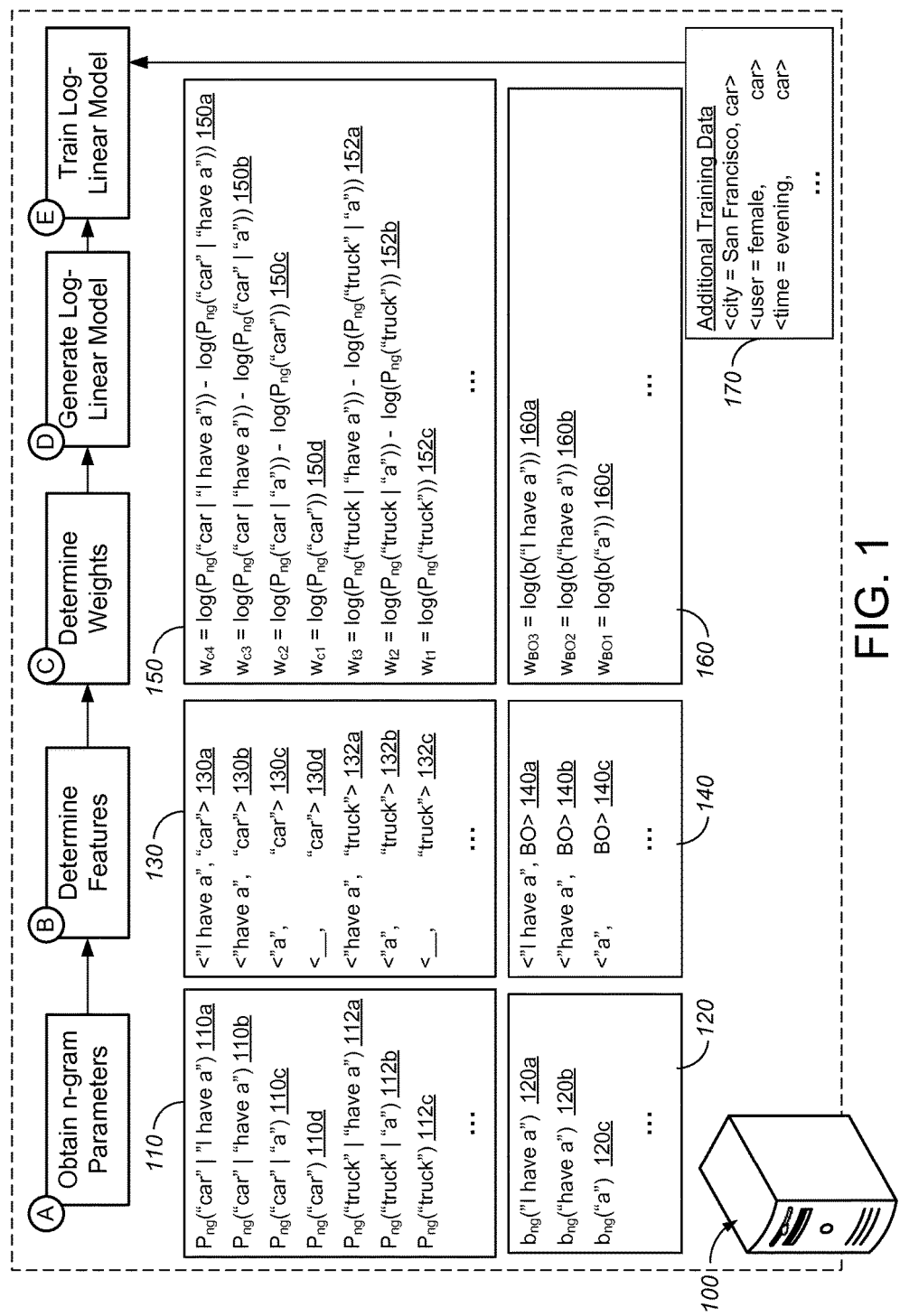
FIG. 1 is a diagram that illustrates an example of a system for generating a log-linear language model based on an n-gram model.

In general, log-linear based language models are powerful models that allow the incorporation of multiple knowledge sources as features in a unified framework. The log-linear based language models may be extremely flexible but require computationally expensive iterative training algorithms. In some implementations, a feature may be n-grams, a local sequence of n words.

In general, backoff n-gram Maximum Likelihood (ML) models use only n-gram features, yet can be estimated very efficiently. In some implementations, a backoff n-gram model may be converted into n-gram feature parameters for a log-linear language model. For example, the resulting log-linear language model may be equivalent to the original ML model after the conversion. In some implementations, the log-linear model may be augmented with additional features and then be retrained or adapted, leading to a faster training of log-linear models, while keeping flexibility and power. In some implementations, the log-linear model converted from a backoff n-gram model may perform better on the tail of the distribution when compared to traditional training.

In some implementations, $x_i$ may be the word at position i in the string X, $x_{i-k}^{i-1} = x_{i-k} \ldots x_{i-1}$ may be the prefix history of the string prior to $x_i$, and $\overline{P}$ may be a probability estimate assigned to seen n-grams by the specific smoothing method. A backoff n-gram language model formulation may be as follows:

$$P_{ng}(x_i \mid x_{i-k}^{i-1}) = \begin{cases} \overline{P}(x_i \mid x_{i-k}^{i-1}) & \text{if } c(x_{i-k}^{i}) > 0 \\ \alpha(x_{i-k}^{i-1}) P(x_i \mid x_{i-k+1}^{i-1}) & \text{otherwise} \end{cases} \quad (1)$$

In some implementations, a recursive smoothing formulation has two kinds of parameters: n-gram probabilities $\overline{P}(x_i \mid x_{i-k}^{i-1})$ and backoff weights $\alpha(x_{i-k}^{i-1})$ used to normalize the model when backing off to lower order n-grams.

In some implementations, a log-linear model may be specified as a set of binary features $f_j(x_i, x_0^{i-1})$ with associated weights $$P(x_i \mid x_{i-k}^{i-1}) = \frac{\exp\left(\sum_j f_j(x_i, x_{i-k}^{i-1}) w_j\right)}{Z(x_{i-k}^{i-1})} \quad (2)$$

$$Z(x_{i-k}^{i-1}) = \sum_{v \in V} \exp\left(\sum_j f_j(v, x_{i-k}^{i-1}) w_j\right) \quad (3)$$

A standard backoff n-gram language model may be estimated directly from counts $c(x_{i-k}^{i})$, using closed form analytical formulas. A log-linear model may be trained using iterative numerical techniques based on some form of gradient descent, which may be expensive.

In some implementations, initialization of the bias feature weights with the relative frequency of the target may be used as a machine learning technique that can be seen as initializing a log-linear model with a 1-gram maximum likelihood model. In some implementations, the initializing of the log-linear model may be done with n-gram of arbitrary order.

The technique may be seen as generalizing Minimum Discrimination Information (MDI) modeling. In MDI, the log-linear objective function may be augmented with a prior model Q that can be a traditional backoff n-gram or any other language model.

$$P(x_i \mid x_{i-k}^{i-1}) = Q(x_i \mid x_{i-k}^{i-1}) \frac{\exp\left(\sum_j f_j(x_i, x_{i-k}^{i-1}) w_j\right)}{Z(x_{i-k}^{i-1})} \quad (4)$$

In some implementations, an MDI adapted version of the original model Q may be obtained by allowing an n-gram prior Q to be encoded directly in a subset of the log-linear model features, if these features are kept fixed while the other are retrained.

In some implementations, a standard backoff n-gram language model may be converted to an equivalent log-linear model as follows. A log-linear language model containing n-grams features may have the following structure:

$$P(x_i \mid x_{i-k}^{i-1}) = \frac{\exp\left(\sum_{j=1}^{k} w_{k-j}(x_i, x_{i-k+j}^{i-1})\right)}{Z(w_{i-k}^{i-1})} \quad (5)$$

$$Z(x_{i-k}^{i-1}) = \sum_{v \in V} \exp\left(\sum_{j=1}^{k} w_{k-j}(v, x_{i-k+j}^{i-1})\right) \quad (6)$$

where $w_k$ is simplified notation for the weight of a given n-gram feature of order k. In some implementations, by converting the original n-gram probabilities to the logarithmic domain and by using the nesting structure of n-grams to cancel lower order n-gram scores by higher ones, the following conversion equations may be obtained:

$$w_0(x_i) = \log \overline{P}(x_i) \quad (7)$$

$$w_k(x_i, x_{i-k}^{i-1}) = \begin{cases} \log \overline{P}(x_i \mid x_{i-k}^{i-1}) - \log \overline{P}(x_i, x_{i-k+1}^{i-1}) & \text{if } c(x_{i-k}^{i}) > 0 \\ \log \alpha(x_{i-k}^{i-1}) & \text{otherwise} \end{cases} \quad (8)$$

In some implementations, the resulting model may not be intrinsically sparse and may require an implementation with support for backoff features shared between all non-observed n-grams in a given $x_{i-k}^{i-1}$. In some implementations, these features may be initialized with $\log \alpha(x_{i-k}^{i-1})$.

In some implementations, this feature may be removed by dividing both the numerator and denominator of equation 8 by $\alpha(x_{i-k}^{i-1})$, leading to the following sparse conversion equation:

$$\overline{w}_k(x_i, x_{i-k}^{i-1}) = w_k(x_i, x_{i-k}^{i-1}) - \log \alpha(x_{i-k}^{i-1}) \quad (9)$$

In some implementations, weights $\overline{w}$ for n-grams not included in the original model $\overline{P}$ may be zero and the corresponding features removed from the model.

In some implementations, more features may be added by scaling all bootstrapped weights by a constant $0 \leq \lambda \leq 1$. This can be seen as the log linear interpolation of the bootstrapped model with an uniform model, and has the effect of flattening the distribution of $w_i$ in each context, while preserving the rank of predictions in that context.

FIG. 1 is a block diagram that illustrates an example of a computing system 100 for generating a log-linear model based on an n-gram model. The functions performed by the computing system 100 can be performed by one or more individual computer systems or can be distributed across multiple computer systems.

In general, an n-gram language model may be trained using a corpus of training data to indicate likelihoods of word sequences. The n-gram model may be used to recognize utterances spoken by users of a speech recognition system. For example, the speech recognition system may be configured to use the n-gram model to recognize a word spoken by a user based on preceding words that have been spoken by the user. In some implementations, the n-gram model may be trained by the computing system 100. In some other implementations, the n-gram model may be trained by one or more other computing systems not included in FIG. 1.

A log-linear language model may be used in the speech recognition system as an alternative to the n-gram language model, and doing so can provide various advantages. In some implementations, the log-linear model may be trained based on the n-gram parameters of the n-gram model to yield performance that is as good as or superior to the n-gram model. In some implementations, additional linguistic and/or non-linguistic features may be defined in the log-linear model to further improve the performance of the log-linear model. For example, the log-linear model may explicitly include backoff features to evaluate words in n-grams that are not included in the n-gram model.

In the example of FIG. 1, a computing system 100 generates a log-linear language model based on parameters of an n-gram language model. FIG. 1 shows stages (A) to (E) which illustrate a flow of data.

During stage (A), the computing system 100 obtains n-gram parameters 110 of an n-gram language model. In general, an n-gram language model includes n-gram parameters that have been generated to represent likelihoods of words presented in n-grams. In some implementations, the n-gram model may be a maximum likelihood (ML) n-gram model. In some implementations, the computing system 100 may obtain an n-gram model trained by another computing system to obtain the n-gram parameters 110. In some other implementations, the computing system 100 may train the n-gram model using training data to obtain the n-gram parameters 110. In some other implementations, the computing system 100 may obtain n-gram parameters 110 directly from another computing system or a data storage.

In some implementations, an n-gram parameter may be a probability of an occurrence of a word given the occurrence of preceding n−1 words. This probability may be determined based on a set of the training data, where the training data may be a corpus of documents, a corpus of transcribed utterances, spoken utterances from one or more training users, or any other types of training data. For example, a four-gram parameter 110a $P_{ng}$("car"|"I have a") represents a conditional probability of an occurrence of the word "car" given the preceding three words "I have a," where the probability is determined according to the frequency that this sequence occurs in the training data. As another example, a trigram parameter 110b $P_{ng}$("car"|"have a") represents a conditional probability of an occurrence of the word "car" given the preceding two words "have a," where the probability reflects a frequency of occurrence of the sequence in the training data. As another example, a bigram parameter 110c $P_{ng}$("car"|"a") represents a conditional probability of an occurrence of the word "car" given the preceding word "a," where the probability reflects a frequency of occurrence of the sequence in the training data. As another example, a unigram parameter 110d $P_{ng}$("car") represents a probability of occurrence of the word "car," where the probability is also determined according to the training data.

In some implementations, the n-gram parameters 110 may be used by a speech recognition system to transcribe utterances spoken by users. For example, the four-gram parameter 110a $P_{ng}$("car"|"I have a") may be used to represent the probability that a user has spoken the word "car" given that the user has spoken the words "I have a." Similarly, the trigram parameter 110b $P_{ng}$("car"|"have a") may be used to represent the probability that a user has spoken the word "car" given that the user has spoken the words "have a." In some implementations, a generalized formulation of the probability for an n-gram $X = x_1 \ldots x_n$ that is in the n-gram model may be formulated as:

$$P(x_n|x_1 \ldots x_{n-1}) = P_{ng}(x_n|x_1 \ldots x_{n-1}) \quad (10),$$

where $P(x_n|x_1 \ldots x_{n-1})$ represents the probability that a user has spoken the word "$x_n$" given that the user has spoken the words "$x_1 \ldots x_{n-1}$" in the n-gram X, and $P_{ng}(x_n|x_1 \ldots x_{n-1})$ represents the corresponding n-gram parameter that is in the n-gram model. As described throughout the application, P represents a probability generally, which may not be necessarily stored as a parameter of the n-gram model.

In general, a user may sometimes speak an utterance that includes an n-gram that is not in the n-gram model. As used herein, an n-gram language model is considered to "include" an n-gram when it has a parameter value, such as a conditional probability of occurrence, corresponding to the n-gram. In some implementations, backoff parameters 120 in an n-gram model may be used to determine the probability of occurrence of a word when the n-gram is not included in the n-gram model. A backoff parameter represents an adjustment to the probability given a particular n-gram is not included in an n-gram model. For example, if the n-gram model does not have a parameter corresponding to the four-gram "I have a truck", the probability that a user has spoken the word "truck" given that the user has spoken the words "I have a" may be represented by a product between the backoff parameter 120a and the probability that a user has spoken the word "truck" given that the user has spoken the words "have a" as:

$$P(\text{"truck"}|\text{"I have a"}) = b_{ng}(\text{"I have a"}) \times P(\text{"truck"}|\text{"have a"}) \quad (11).$$

If the tri-gram "have a truck" is included in the n-gram model, as represented by the n-gram parameter 112a, the probability in Equation (11) may be represented by a product between the backoff parameter 120a and the trigram parameter 110b as:

$$P(\text{"truck"}|\text{"I have a"}) = b_{ng}(\text{"I have a"}) \times P_{ng}(\text{"truck"}|\text{"have a"}) \quad (12).$$

A generalized formulation of the probability for an n-gram $X = x_1 \ldots x_n$ that is not in the n-gram model may be formulated as:

$$P(x_n|x_1 \ldots x_{n-1}) = b_{ng}(x_1 \ldots x_{n-1}) \times P(x_n|x_2 \ldots x_{n-1}) \quad (13),$$

where $P(x_n|x_1 \ldots x_{n-1})$ represents the probability that a user has spoken the word "$x_n$" given that the user has spoken the words "$x_1 \ldots x_{n-1}$" in the n-gram X, $b_{ng}(x_1 \ldots x_{n-1})$ represents the backoff parameter for the preceding words in the n-gram model, and $P(x_n|x_2 \ldots x_{n-1})$ represents the probability that a user has spoken the word "$x_n$" given that the user has spoken the words "$x_2 \ldots x_{n-1}$". In some implementations, the backoff parameters 120 may be values that have been manually assigned by a developer of the n-gram model. In some other implementations, the backoff parameters 120 may be values that have been automatically assigned during the n-gram model training. In some implementations, the backoff parameters 120 may be a predetermined value for all n-grams. In some implementations, a single backoff value can be used for each length of n-gram. For example, a single four-gram backoff parameter may be used for any instance when a four-gram not in the model is encountered. A trigram backoff parameter, which may have a different value from the four-gram backoff parameter, may be used when evaluating any trigram not in the model.

In some implementations, the model includes different backoff parameters for backoffs involving different n-grams of the same length. For example, the parameter that the model designates for backoff from a four-gram to the trigram "I have a" may be different from the parameter the model designates for backoff from a four-gram to the trigram "I am a." The model may include appropriate backoff parameters to be able to evaluate any potential n-gram that the model may encounter. In some implementations, the n-gram parameters and the backoff parameters may be formulated as expressed in Equation (1).

During stage (B), the computing system 100 determines n-gram features 130 for a log-linear language model based on the n-gram language model. In general, a speech recognition system can use a log-linear language model that includes the n-gram features 130 and/or other linguistic and/or non-linguistic features to recognize spoken utterances. In some implementations, a log-linear model may be formulated as expressed in Equation (2), Equation (4), or Equation (5) above.

In some implementations, the n-gram features 130 may be determined based on the n-grams included in an n-gram model. For example, the n-gram model includes a four-gram "I have a car", corresponding trigrams "I have a" and "have a car", corresponding bigrams "I have", "have a", and "a car", and corresponding unigrams "I", "have", "a", "car." An n-gram feature 130 of the log-linear model may be defined for each of these different n-grams. In general, an n-gram feature 130 of the log-linear model may be defined for each n-gram parameter 110 of the n-gram model. In some implementations, based on these n-grams in the n-gram model, the computing system 100 may determine n-gram features <"$x_1 \ldots x_{n-1}$"|"$x_n$"> corresponding to n-grams $X = x_1 \ldots x_n$, where each n-gram feature represents the occurrence of the word $x_n$ given the preceding words $x_1$ to $x_{n-1}$ in an n-gram. For example, the n-gram features 130 may include a four-gram feature 130a <"I have a", "car"> to represent the occurrence of the word "car" given the preceding words "I have a" in a four-gram. As another example, the n-gram features 130 may include a trigram feature 130b <"have a", "car"> to represent the occurrence of the word "car" given the preceding words "have a" in a trigram. As another example, the n-gram features 130 may include a bigram feature 130c <"a", "car"> to represent the occurrence of the word "car" given the preceding word "a" in a bigram. As another example, the n-gram features 130 may include a unigram feature 130d <"_____", "car"> to represent the occurrence of the word "car" in a unigram.

In some implementations, the computing system 100 may determine backoff features 140 for a log-linear model based on the n-gram model. The backoff features 140 may be used by a speech recognition system to determine a last word in an n-gram spoken by the user, where the n-gram is not included in the log-linear model. In some implementations, the backoff features 140 may be determined based on the n-grams included in an n-gram model. For example, the backoff features 140 may include a backoff feature 140a <"I have a", BO> to represent an absence of a four-gram in the n-gram model, where the preceding trigram "I have a" is included in the n-gram model. As another example, the backoff features 140 may include a backoff feature 140b <"have a", BO> to represent an absence of the trigram in the n-gram model, where the preceding bigram "have a" is included in the n-gram model. As another example, the backoff features 140 may include a backoff feature 140c <"a", BO> to represent an absence of the bigram in the n-gram model, where the preceding unigram "a" is included in the n-gram model. In some implementations, the backoff features defined for the log-linear model correspond to the backoff parameters of the n-gram model. The log-linear model can have a backoff feature 140 for each backoff parameter 120 of the n-gram model.

During stage (C), the computing system 100 determines weights 150 or scores for the n-gram features 130 in the log-linear model. Each n-gram feature can be individually assigned a weight 150. The weights can be used to determine probabilities of a sequence of words. For example, given that the user has spoken the words "I have a", a speech recognition system based on a log-linear model may determine the probability of the word "car" being spoken by a user based on n-gram features "<"I have a", "car">", "<"have a", "car">", "<"a", "car">", and "<_____", "car">", and the respective weight associated with each n-gram feature.

In some implementations, the computing system 100 may initialize weights of n-gram features such that the probabilities of word occurrences generated by the log-linear model are correlated to the corresponding probabilities generated by the n-gram model. For example, the weights may be set so that the log-linear model produces the same probabilities as the n-gram model. This weight initialization provides an advantage that the log-linear model would perform at least as well as the n-gram model. For example, the computing system 100 may be configured to determine weights $w_{c4}$ 150a, $w_{c3}$ 150b, $w_{c2}$ 150c, and $w_{c1}$ 150d for the four-gram feature 130a "<"I have a", "car">", the trigram feature 130b "<"have a", "car">", the bigram feature 130c "<"a", "car">", and the unigram feature 130d "<_____", "car">", respectively. The computing system 100 may initialize $w_{c4}$ 150a, $w_{c3}$ 150b, $w_{c2}$ 150c, and $w_{c1}$ 150d of the log-linear model based on the n-gram parameters 110a to 110d from the n-gram model as:

$$w_{c4}=\log(P_{ng}(\text{"car"}|\text{"I have a"}))-\log(P_{ng}(\text{"car"}|\text{"have a"})) \quad (14),$$

$$w_{c3}=\log(P_{ng}(\text{"car"}|\text{"have a"}))-\log(P_{ng}(\text{"car"}|\text{"a"})) \quad (15),$$

$$w_{c2}=\log(P_{ng}(\text{"car"}|\text{"a"}))-\log(P_{ng}(\text{"car"})) \quad (16), \text{ and}$$

$$w_{c1}=\log(P_{ng}(\text{"car"})) \quad (17).$$

In some implementations, given that the user has spoken the words "I have a", the probability $P_{LL}$, as determined by the log-linear model, of the word "car" being spoken may be formulated as:

$$P_{LL}(\text{"car"}|\text{"I have a"}) = \frac{\exp\left(\sum_{i=1}^{4} w_{ci}\right)}{Z} \quad (18)$$

$$= \frac{\exp(\log(P_{ng}(\text{"car"}|\text{"I have a"})))}{Z}$$

$$= \frac{P_{ng}(\text{"car"}|\text{"I have a"})}{Z},$$

where Z is a normalization factor that represents an exponential of weights of all the words μ in the n-gram features <"I have a", "μ">, <"have a", "μ">, <"a", μ">, and <_____, "μ"> in the log-linear model. For example, the normalization factor Z may include weights of n-gram features 130a <"I have a", "car">, 130b <"have a", "car">, 130c <"a", "car">, 130d <_____, "car">, 132a <"have a", "truck">, 132b <"a", "truck">, and 132c <_____, "truck">. In some implementations, the normalization factor may be the one expressed in Equation (3) or Equation (6). In some implementations, the normalization factor is 1. In some implementations, the normalization factor may be manually assigned. By summing the weights 150a to 150d associated with n-gram features 130a to 130d, most of the terms cancel with each other, and the probability determined by the log-linear model is equal to the probability determined by the n-gram model (e.g., element 110a) scaled by a normalization factor. This formulation is applicable to all n-grams that are included in the n-gram model.

In some implementations, the computing system 100 may initialize weights of backoff features such that for n-grams that are not included in the n-gram model, the probabilities of word occurrences generated by the log-linear model are correlated to the corresponding probabilities generated by the n-gram model. The probabilities of word occurrences generated by the log-linear model may be correlated to the corresponding probabilities generated by the n-gram model when the probability determined by the log-linear model equals the probability determined by the n-gram model scaled by a normalization factor. For example, if the four-gram "I have a truck" is not included in the n-gram model, given that the user has spoken the words "I have a", a speech recognition system based on a log-linear model may determine the probability of the word "truck" being spoken by a user based on n-gram features "<"have a", "truck">" 132a, "<"a", "truck">" 132b, and "<_____", "truck">" 132c, the backoff feature 140a <"I have a", BO>, and the respective weight associated with each feature.

For example, the computing system 100 may determine weights $w_{t3}$ 152a, $w_{t2}$ 152b, and $w_{t1}$ 152c for the trigram feature 132a "<"have a", "truck">", the bigram feature 132b "<"a", "truck">", and the unigram feature 132c "<_____", "truck">", respectively. The computing system 100 may initialize $w_{t3}$ 152a, $w_{t2}$ 152b, and $w_{t1}$ 152c of the log-linear model based on the n-gram parameters 112a to 112c from the n-gram model as:

$$w_{t3}=\log(P_{ng}(\text{"truck"}|\text{"have a"}))-\log(P_{ng}(\text{"truck"}|\text{"a"})) \quad (19),$$

$$w_{t2}=\log(P_{ng}(\text{"truck"}|\text{"a"}))-\log(P_{ng}(\text{"truck"})) \quad (20), \text{ and}$$

$$w_{t1}=\log(P_{ng}(\text{"truck"})) \quad (21).$$

Moreover, the value of each backoff feature 140 of the log-linear model may be derived from a corresponding backoff parameter 120 of the n-gram model. The computing system 100 may initialize the weight $w_{BO3}$ 160a associated with the backoff feature 140a <"I have a", BO> of the log-linear model based on the backoff parameters 120a of the n-gram model as:

$$w_{BO3}=\log(b_{ng}(\text{"I have a"})) \quad (22)$$

In some implementations, given that the user has spoken the words "I have a", the probability of the word "truck" being spoken by a user in a log-linear model may then be formulated as:

$$P_{LL}(\text{"truck"} \mid \text{"I have a"}) = \frac{\exp\left(w_{BO3} + \sum_{i=1}^{3} w_i\right)}{Z} \quad (23)$$

$$= \frac{\exp(\log(b_{ng}(\text{"I have a"})) + \log(P_{ng}(\text{"truck"} \mid \text{"have a"})))}{Z}$$

$$= \frac{\exp(\log(b_{ng}(\text{"I have a"}) \times P_{ng}(\text{"truck"} \mid \text{"have a"})))}{Z}$$

$$= \frac{b_{ng}(\text{"I have a"}) \times P_{ng}(\text{"truck"} \mid \text{"have a"})}{Z},$$

where Z is a normalization factor as described above. By summing the weights 152a to 152c associated with n-gram features 132a to 132c and the weight 160a associated with the backoff feature 140a, many terms cancel with each other, and the probability determined by the log-linear model correlates to the probability determined by the n-gram model (e.g., Equation (12)) scaled by a normalization factor. This formulation is applicable to all backoff parameters included in the n-gram model. In some implementations, weights 150 of n-gram features 130 and weights 160 of backoff features 140 may be formulated as expressed in Equations (7) and (8).

During stage (D), the computing system 100 is uses the determined features and weights to generate a log-linear model. In general, using n-gram weights 150 and optionally backoff weights 160 provides a log-linear model performance that is at least as accurate as the n-gram model. In some implementations, the computing system 100 may use the n-gram features 130 and the respective weights 150 as initial parameters to generate a log-linear model. The computing system 100 may additionally use the backoff features 140 and the respective weights 160 as initial parameters to generate the log-linear model. In some implementations, the computing system 100 may additionally use other linguistic and/or non-linguistic features and the respective weights as initial parameters to generate a log-linear model.

In some implementations, the computing system 100 may apply one or more scaling factors to one or more weights to generate a log-linear model. For example, instead of associating the unigram feature 130d <_____, "car"> with the weight $w_{c1}$ 150d as $\log(P_{ng}(\text{"car"}))$, the computing system 100 may associate the unigram feature 130d <_____, "car"> with a weight $(\beta \times \log(P_{ng}(\text{"car"})))$, where β is a scaling factor. The scaling factor may help with the training of the log-linear model to converge to a globally-optimal model when other features that are not n-gram features from an n-gram model are also added to the log-linear model.

When the weights are derived directly from a trained n-gram model, then further training of the log-linear model may not produce many changes to the weights, since the entire probability distribution is fully allocated to the features derived from the n-gram model. The weights may tend to remain very close to the initial values set based on the n-gram model A scaling factor of less than 1, e.g., 0.9, 0.7, 0.5, etc., can be applied to decrease the weights, causing the total probability distribution represented by the initial weights to be less than 1. Leaving unallocated space within the probability distribution allows room to allocate probability to new features that are different from the n-gram features and backoff features derived from the n-gram model. It also increases the potential for adjusting the values of weights for features that are derived from the n-gram model. Different scaling factors can be applied to weights of different n-gram features. For example, scaling factors can be assigned based on the order of the n-gram. Weights for four-gram features can be determined using one scaling factor, weights for three-gram features can be determined using a different scaling factor, and so on. Similarly, the scaling factors used to determine weights for n-gram features can vary according to the frequency or probability of occurrence indicated by the n-gram model.

During stage (E), the computing system 100 can optionally train the log-linear model. Because the initial weights are derived from the n-gram model, the log-linear model inherits, in part or in its entirety, the training state of the n-gram model. This can be advantageous because the training process for an ML n-gram language model can be faster and less computationally expensive than the training process for a log-linear language model. After initialization, further training of the log-linear model can refine the log-linear model and adjust the weights. Further training can also allow the log-linear model to incorporate additional features that do not directly correspond to the n-gram parameters and backoff parameters of the n-gram model. In particular, the log-linear model can define non-linguistic features that represent non-linguistic context elements, such as a geographical location, a gender of a user, a time, and so on, and further training can allow appropriate weights to be generated for these features.

In some implementations, training data used to train the n-gram model is used to train the log-linear model. In some implementations, other training data is used to train the log-linear model. In some implementations, additional training data 170 is used to train the log-linear model. For example, the additional training data 170 may include non-linguistic data associated with a unigram such as the location of a user device, a gender of the user, the time when the utterance is spoken, etc. In some implementations, one or more of the n-gram weights 150 may change as a result of training. In some implementations, one or more of the backoff weights 160 may change as a result of training. When other features are included in the log-linear model, those weights for those features may also change as a result of training.

Figure 2:
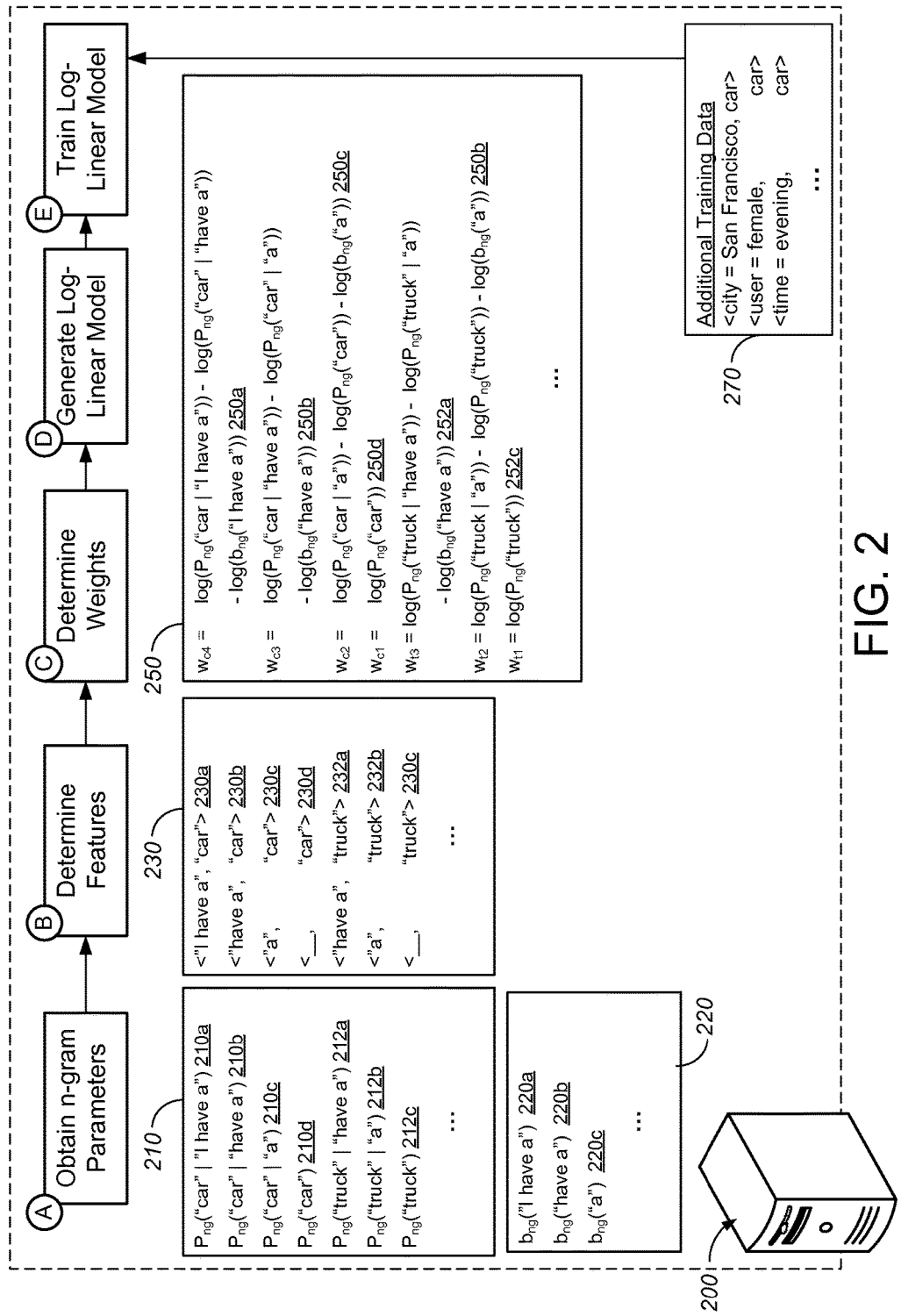
FIG. 2 is a diagram that illustrates another example of a system for generating a log-linear language model based on an n-gram model.

FIG. 2 is a block diagram that illustrates an example of a computing system 200 for generating a log-linear model based on an n-gram model, where backoff features are implicitly incorporated in the n-gram features. Unlike the system 100 of FIG. 1, which includes explicit backoff features 140 and corresponding weights 160, the system 200 of FIG. 2 accounts for backoffs without including explicit backoff features or backoff weights. The functions performed by the computing system 200 can be performed by one or more individual computer systems or can be distributed across multiple computer systems. In general, a backoff feature may be included in an n-gram feature during an initialization of a log-linear model to produce a model having a smaller size, as the log-linear model does not explicitly store the backoff features. FIG. 2 shows stages (A) to (E) which illustrate a flow of data.

During stage (A), the computing system 200 obtains n-gram parameters 210 from an n-gram model, similar to the descriptions in FIG. 1. In some implementations, the computing system 200 may be configured to obtain backoff parameters 220 from the n-gram model. In some implementations, the backoff parameters 220 may be values that have been manually assigned by a developer of the n-gram model. In some other implementations, the backoff parameters 220 may be values that have been automatically assigned during the n-gram model training. In some implementations, the backoff parameters 220 may be a predetermined value for all n-grams.

During stage (B), the computing system 200 determines n-gram features 230 for a log-linear model based on the n-gram model, similar to the descriptions in FIG. 1. For example, an n-gram feature 230 is defined for each of the n-grams of the n-gram model. For example, the n-gram model includes a four-gram "I have a car", corresponding trigrams "I have a" and "have a car", corresponding bigrams "I have", "have a", and "a car", and corresponding unigrams "I", "have", "a", "car." In some implementations, based on these n-grams in the n-gram model, the computing system 200 may determine n-gram features $<$"$x_1$ . . . $x_{n-1}$"|"$x_n$"$>$ corresponding to n-grams $X=x_1$ . . . $x_n$, where each n-gram feature represents a presence of the word $x_n$ given the preceding words $x_1$ to $x_{n-1}$ in an n-gram. For example, the n-gram features 230 may include a four-gram feature 230a $<$"I have a", "car"$>$ to represent a presence of the word "car" given the preceding words "I have a" in a four-gram. As another example, the n-gram features 230 may include a trigram feature 230b $<$"have a", "car"$>$ to represent a presence of the word "car" given the preceding words "have a" in a trigram. As another example, the n-gram features 230 may include a bigram feature 230c $<$"a", "car"$>$ to represent a presence of the word "car" given the preceding word "a" in a bigram. As another example, the n-gram features 230 may include a unigram feature 230d $<$"_____", "car"$>$ to represent a presence of the word "car" in a unigram. In the implicit backoff feature formulation, the computing system 200 does not determine backoff features for a log-linear model based on the n-gram model because the backoff features are incorporated in the weights of the n-gram features, as described below.

During stage (C), the computing system 200 determines weights 250 of the n-gram features 230 in the log-linear model. In some implementations, the computing system 100 may initialize weights of n-gram features such that the weights incorporate backoff features. The probabilities of word occurrences generated by the log-linear model are correlated to the corresponding probabilities generated by the n-gram model. The probabilities of word occurrences generated by the log-linear model may be correlated to the corresponding probabilities generated by the n-gram model when the probability determined by the log-linear model equals the probability determined by the n-gram model scaled by a normalization factor. For example, the computing system 200 may be configured to determine weights $w_{c4}$ 250a, $w_{c3}$ 250b, $w_{c2}$ 250c, and $w_{c1}$ 250d for the four-gram feature 130a "$<$"I have a", "car"$>$", the trigram feature 130b "$<$"have a", "car"$>$", the bigram feature 130c "$<$"a", "car"$>$", and the unigram feature 130d "$<$"_____", "car"$>$" as follows. Several of the weight calculations include terms based on n-gram backoff features $b_{ng}$:

$$w_{c4}=\log(P_{ng}(\text{"car"}|\text{"I have a"}))-\log(P_{ng}(\text{"car"}|\text{"have a"}))-\log(b_{ng}(\text{"I have a"})) \quad (24),$$

$$w_{c3}=\log(P_{ng}(\text{"car"}|\text{"have a"}))-\log(P_{ng}(\text{"car"}|\text{"a"}))-\log(b_{ng}(\text{"have a"})) \quad (25),$$

$$w_{c2}=\log(P_{ng}(\text{"car"}|\text{"a"}))-\log(P_{ng}(\text{"car"}))-\log(b_{ng}(\text{"a"})) \quad (26), \text{ and}$$

$$w_{c1}=\log(P_{ng}(\text{"car"})) \quad (27).$$

In some implementations, given that the user has spoken the words "I have a", the probability of the word "car" being spoken by a user in a log-linear model may be formulated as:

$$P_{LL}(\text{"car"}|\text{"I have a"}) = \frac{\exp\left(\sum_{i=1}^{4} w_{ci}\right)}{Z}$$

$$= \frac{\exp\big(\log(P_{ng}(\text{"car"}|\text{"I have a"})) - \log(b_{ng}(\text{"I have a"})) - \log(b_{ng}(\text{"have a"})) - \log(b_{ng}(\text{"a"}))\big)}{Z}$$

$$= \frac{\left(\frac{P_{ng}(\text{"car"}|\text{"I have a"})}{(b_{ng}(\text{"I have a"})) \times (b_{ng}(\text{"have a"})) \times (b_{ng}(\text{"a"}))}\right)}{Z}, \quad (28)$$

where Z is a normalization factor that represents an exponential of weights of all the words μ in the n-gram features $<$"I have a", "μ"$>$, $<$"have a", "μ"$>$, $<$"a", μ"$>$, and $<$_____, "μ"$>$ in the log-linear model, as described in FIG. 1. For example, the normalization factor Z may include weights of n-gram features 230a $<$"I have a", "car"$>$, 230b $<$"have a", "car"$>$, 230c $<$"a", "car"$>$, 230d $<$_____, "car"$>$, 232a $<$"have a", "truck"$>$, 232b $<$"a", "truck"$>$, and 232c $<$_____, "truck"$>$. Since the weights of the n-gram features 230a $<$"I have a", "car"$>$, 230b $<$"have a", "car"$>$, 230c $<$"a", "car"$>$, and 230d $<$_____, "car"$>$ are included in both the numerator and the denominator of the normalization factor Z, the implicit backoff parameters $b_{ng}$("I have a"), $b_{ng}$("have a"), and $b_{ng}$("a") are canceled, and $P_{LL}$("car"|"I have a") in the log-linear model is correlated to $P_{ng}$("car"|"I have a") in the n-gram model.

In some implementations, the weights of backoff features are zero, such that the log-linear model does not need to store backoff features and respective weights. For example, if the four-gram "I have a truck" is not included in the n-gram model, the computing system 200 may be configured to determine weights $w_{t3}$ 252a, $w_{t2}$ 252b, and $w_{t1}$ 252c for the trigram feature 232a "$<$"have a", "truck"$>$", the bigram feature 232b "$<$"a", "truck"$>$", and the unigram feature 232c "$<$"_____", "truck"$>$", respectively. The computing system 200 may initialize $w_{t3}$ 252a, $w_{t2}$ 252b, and $w_{t1}$ 252c of the log-linear model based on the n-gram parameters 212a to 212c from the n-gram model as:

$$w_{t3}=\log(P_{ng}(\text{"truck"}|\text{"have a"}))-\log(P_{ng}(\text{"truck"}|\text{"a"}))-\log(b_{ng}(\text{"have a"})) \quad (29),$$

$$w_{t2}=\log(P_{ng}(\text{"truck"}|\text{"a"}))-\log(P_{ng}(\text{"truck"}))-\log(b_{ng}(\text{"a"})) \quad (30), \text{ and}$$

$$w_{t1}=\log(P_{ng}(\text{"truck"})) \quad (31).$$

For the backoff feature $<$"I have a", BO$>$, the weight may be formulated as:

$$w_{BO3} = \log(P_{ng}(\text{"truck"}|\text{"I have a"})) - \log(P_{ng}(\text{"truck"}|\text{"have a"})) - \log(b_{ng}(\text{"I have a"}))$$

$$= \log(P_{ng}(\text{"truck"}|\text{"have a"})) + \log(b_{ng}(\text{"I have a"})) - \quad (32)$$

-continued $$\log(P_{ng}(\text{``truck''} \mid \text{``have a''})) - $$
$$\log(b_{ng}(\text{I have a''}))$$
$$= 0.$$

Under this formulation, when a backoff feature is triggered in the log-linear model, the corresponding weight is zero. Accordingly, the log-linear model does not need to store backoff features and respective weights.

In some implementations, given that the user has spoken the words "I have a", the probability determined by the log-linear model for the occurrence of the word "truck" may then be formulated as:

$$P_{LL}(\text{``truck''} \mid \text{``I have a''}) = \frac{\exp\left(\sum_{i=1}^{3} w_i\right)}{Z} \quad (33)$$

$$= \frac{\exp(\log(P_{ng}(\text{``truck''} \mid \text{``have a''})) - \log(b_{ng}(\text{``have a''})) - \log(b_{ng}(\text{``a''})))}{Z}$$

$$= \frac{\left(\frac{P_{ng}(\text{``truck''} \mid \text{``have a''})}{(b_{ng}(\text{``have a''})) \times (b_{ng}(\text{``a''}))}\right)}{Z},$$

where Z is a normalization factor as described above. Since the weights of the n-gram features 232a <"have a", "truck"> and 232b <"a", "truck"> are included in both the numerator and the denominator of the normalization factor Z, the implicit backoff parameters $b_{ng}$("have a") and $b_{ng}$("a") cancel. Moreover, the normalization factor Z additionally includes a weight 250a $w_{c4}$ for the four-gram feature 230a <"I have a", "car">, where the weight 250a includes a term $-\log(b_{ng}$("I have a")) in the denominator but not the numerator. By multiplying both the denominator and the numerator by the term $b_{ng}$("I have a") and knowing that in an n-gram model the probability that a user has spoken the word "truck" given that the user has spoken the words "have a" can be expressed as P("truck"|"I have a")=$b_{ng}$("I have a")×$P_{ng}$ ("truck"|"have a") (e.g., Equation (12)), it can be derived that the probability determined by the log-linear model equals the probability determined by the n-gram model scaled by a normalization factor. This formulation can be used to generate a probability for any n-gram that does not have a corresponding feature in the log-linear model.

During stage (D), the computing system 200 uses the determined features and weights to generate a log-linear model. In some implementations, the computing system 100 may use the n-gram features 230 and the respective weights 250 as initial parameters to generate a log-linear model, where the backoff features are incorporated in the weights of the n-gram features. In some implementations, the computing system 200 may apply one or more scaling factors to one or more weights to generate a log-linear model. For example, instead of associating the unigram feature 230d <_____, "car"> with the weight $w_{c1}$ 250d as log($P_{ng}$("car")), the computing system 200 may associate the unigram feature 230d <_____, "car"> with a weight (β×log(Png("car"))), where β is a scaling factor. The scaling factor may help with the training of the log-linear model to converge to a globally-optimal model when other features that are not n-gram features from an n-gram model are also added to the log-linear model.

During stage (E), the computing system 200 can optionally train the log-linear model. In some implementations, training data used to train the n-gram model is used to train the log-linear model. In some implementations, other training data is used to train the log-linear model. In some implementations, additional training data 270 is used to train the log-linear model.

Figure 3:
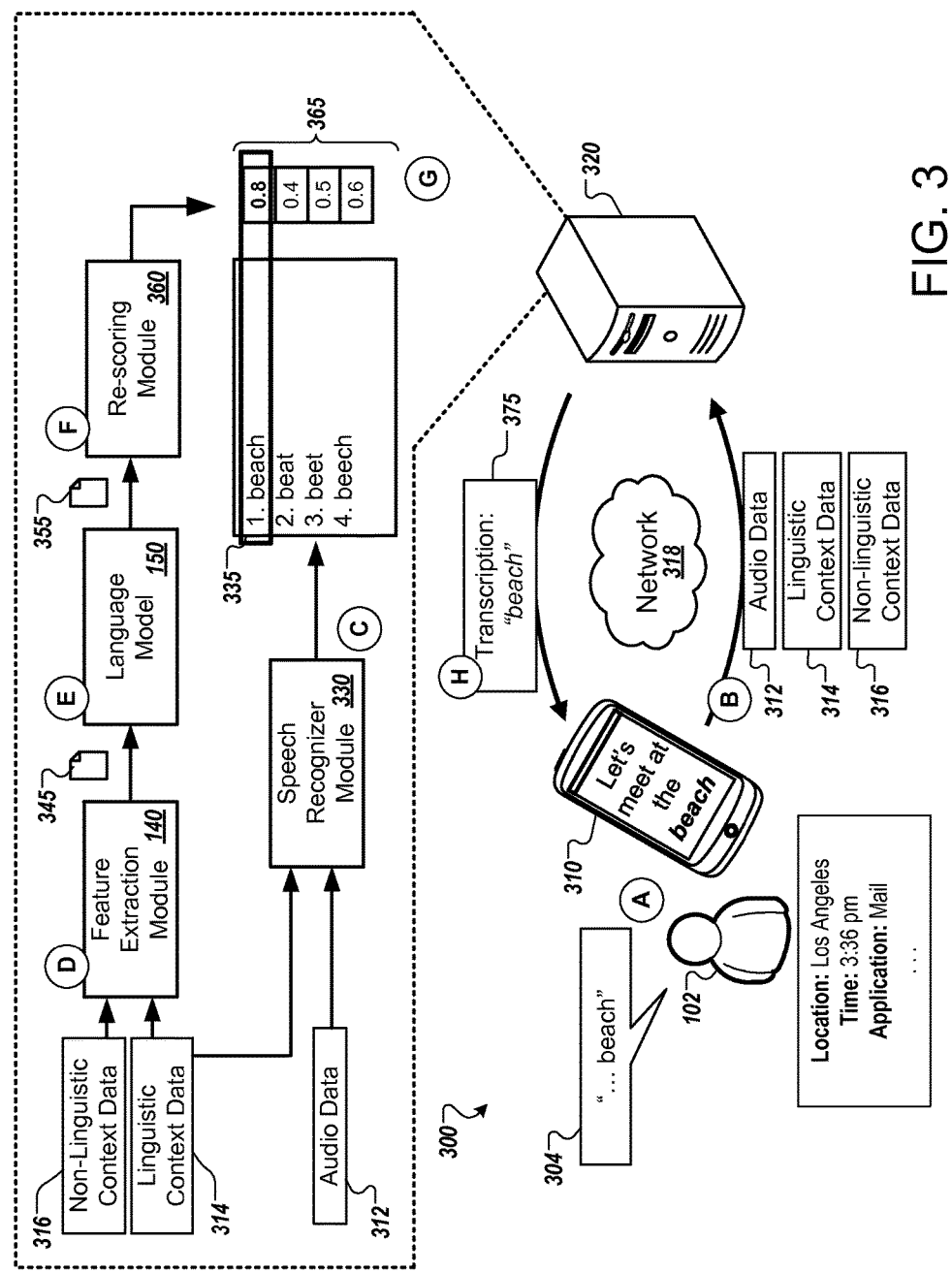
FIG. 3 is a diagram that illustrates an example of a system for speech recognition with a log-linear language model.

FIG. 3 is a diagram that illustrates an example of a system 300 for speech recognition using a log-linear model. The system 300 includes a client device 310, a computing system 320, and a network 318. The computing system 320 receives audio data 312 and, in some implementations, linguistic context data 314 and/or non-linguistic context data 316 from the client device 310. The computing system 320 provides scores determined from the non-linguistic context data 316 to a language model 350, which provides output that the computing system 320 uses to determine a transcription for the audio data 312. The figure shows stages (A) to (H) which illustrate a flow of data.

The client device 310 can be, for example, a desktop computer, a laptop computer, a cellular phone, a smart phone, a tablet computer, a music player, an e-book reader, a wearable computer, a navigation system, or other device. The functions performed by the computing system 320 can be performed by individual computer systems or can be distributed across multiple computer systems, e.g., one or more server systems. The network 318 can be wired or wireless or a combination of both, and may include private networks and/or public networks, such as the Internet.

In some implementations, a system receives audio data indicating characteristics of an utterance and context data indicating non-linguistic context of the utterance. Scores for one or more non-linguistic features can be generated based on the context data. The scores can be provided to a language model trained to estimate likelihoods based at least in part on scores for non-linguistic features. Output of the language model can be received and used to determine a transcription for the utterance. In some implementations, the language model is a log-linear model or maximum entropy model. In some implementations, the language model comprises a support vector machine model, a neural network, a set of classifiers, or another type of model.

In the example of FIG. 3, during stage (A), a user 302 speaks and the client device 310 detects the utterance 304 of the user 302. For example, the client device 310 may record the utterance 304 using a microphone. The user 302 may provide the utterance 304 as voice input to any of a variety of applications, including, for example, an e-mail application, a calendar application, a mapping or navigation application, and so on. Thus, the utterance 304 may represent any of a variety of types of input, for example, a query, a message recipient, the body of a message, a voice command, an address, a phone number, and so on.

In the illustrated example, the user 302 is dictating the contents of an e-mail message while a "Mail" application is running on the client device 310. The user 302 previously entered the text "Let's meet at the" as part of the message, and the utterance 304 includes the word "beach" as further input to add to the message.

During stage (B), the client device 310 collects information and sends information to the computing system 320 over the network 318. The information may be sent with, for example, a request for a transcription of the utterance. For example, the client device 302 sends audio data 312 for the utterance 304 to the computing system 320. The audio data 312 may be, for example, a recording of the utterance 304, or information derived from the detected utterance 304, such as filterbank energy values, mel-frequency cepstral coefficients (MFCCs), or scores for other acoustic features.

The client device 310 may also send linguistic context data 314 that indicates a linguistic context for the utterance 304. For example, the client device 310 may provide data that indicates the words that the utterance 304 follows. In the illustrated example, the linguistic context data 314 indicates the words "Let's meet at the" that immediately precede the utterance 304. In some implementations, the linguistic context data 314 provides a specific amount of text, for example, the previous one, two, three, five, or ten words, or the text recognized within a predetermined amount of time. The linguistic context may include words that were previously spoken by the user and are recognized, and/or text that was entered or accessed in another manner. For example, a user could open a text file, place a cursor at a particular position in the text, and begin speaking to insert additional text. Some amount of text before the cursor may be provided as linguistic context, regardless of how the text in the file was entered.

The client device 310 may also determine and send non-linguistic context data 316 to indicate a non-linguistic context for the utterance 304. The non-linguistic context data may indicate, for example, characteristics of the environment in which the utterance 304 is spoken. The non-linguistic context data 314 can indicate factors related to the physical environment of the user 302 or client device 310, such as geographical location, time, temperature, weather, or ambient noise. The non-linguistic context data 314 can provide information about the physical state of the client device 310, for example, whether the device 310 is moving or stationary, the speed of movement of the device 310, whether the device 310 is being held or not, a pose or orientation of the device 310, whether or not the device 310 is connected to a docking station, and/or the type of docking station to which the client device 310 is connected. The non-linguistic context data 314 can provide information about the operating state of the client device 310, for example, an identifier for an application running on the client device 310, or a category or classification for the application to which that the utterance 304 was provided as input. Similarly, the non-linguistic context data can indicate a particular input field, input field label, an input text format for a field, an identifier for a web page or Internet domain, or other information. The non-linguistic context data 314 can also indicate information about the user 302 that spoke the utterance, for example, a user identifier, whether the user is male or female, or other information from a user profile for the user.

In the illustrated example, the client device 310 determines its location, for example, using a global positioning system (GPS) module or other techniques, and determines that the client device 310 is located in the city of Los Angeles. The client device 310 also determines that the utterance 304 was recorded as input to a mail application running on the client device 310. The client device 310 provides data indicating the location, e.g., "Los Angeles," and the active application, e.g., the "Mail" application, to the computing system 320 as non-linguistic context data 316. The client device also provides the audio data 312 and the linguistic context data 314 to the computing system.

During stage (C), the computing system 320 uses a speech recognizer module 330 to determine candidate transcriptions 335 for the utterance 304. The candidate transcriptions 335 may be provided as, for example, a list, a word lattice, or in other forms. The candidate transcriptions 335 may be scored or ranked to indicate which candidate transcriptions 335 the speech recognizer module 330 estimates to be most likely to be correct transcriptions. In the illustrated example, the candidate transcriptions 335 represent a set of highest ranking or most likely transcriptions, as estimated by the speech recognizer 330. This set can be an n-best list, including, for example, the top 3, 5, 30, 25, or other integer number of candidate transcriptions.

In some implementations, the speech recognizer module 330 uses an acoustic model and a language model to identify the candidate transcriptions 335. The models used by the speech recognizer module 330 may or may not use non-linguistic context data to determine candidate transcriptions. Accordingly, in some instances, the candidate transcriptions 335 may be determined based on the audio data 312 and the linguistic context data 314, without being influenced by the non-linguistic context data 316. Another language model may use information about the non-linguistic context to re-score or re-rank the candidate transcriptions 335 to improve accuracy. In some implementations, the speech recognizer module 330 may use the non-linguistic context data 316 to identify and/or score the candidate transcriptions 335.

During stage (D), the computing system 320 uses a feature extraction module 340 to determine feature scores 345 for various different features. The set of features that feature scores 345 are determined for is the set of features defined in a language model 350 that will receive the feature scores 345 as input. The feature extraction module 340 can determine which n-gram features and backoff features should be set as active, and which should be set as inactive. For example, the computing system 320 can evaluate each candidate transcription to determine a likelihood of occurrence of the candidate transcription given the context.

To determine which features to set as active by assigning a feature score of "1," the computing system 320 may compare n-grams comprising a candidate transcription and at least a portion of the context to n-grams in an n-gram feature dictionary for a language model 350. For the candidate transcription "beach," the computing system 320 can determine whether the n-gram "Let's meet at the beach" matches any of the 5-grams in the n-gram feature dictionary. If there is a matching 5-gram, the matching n-gram feature is given a feature score of "1," and all other n-gram features for 5-grams are given a feature score of "0." Similarly, since the 5-gram was found to have a corresponding n-gram feature, none of the backoff features are activated (e.g., all are given a value of "0") By contrast, if none of the n-gram features match "Let's meet at the beach," then one or more backoff features will be activated. For example, each of the following prefix backoff features may be activated if they are defined as part of the model 150: "<backoff-5>,""<backoff-4, beach>," "<backoff-3, the beach>," "<backoff-2, at the beach>," "<backoff-1, meet at the beach>." Suffix backoff features, e.g., "<Let's meet at the, backoff-1>," and other backoff features may also be activated based on the context. All other backoff features that do not correspond to the n-gram under evaluation, e.g., "<backoff-4, house>" or "<backoff-3, the roof>," would be assigned a value of "0."

In a similar manner, the evaluation of candidate transcription "beach" would also involve determination of feature scores for features corresponding to n-grams with lower values of n. For example, feature scores n-gram features and backoff features representing 4-grams would be determined with respect to the 4-gram "meet at the beach," feature scores for features representing 3-grams would be determined with respect to the 3-gram "at the beach," and so on.

During stage (E), the feature scores 345 are provided as input to the language model 350. Based on the feature scores 345, the language model 350 provides a set of output values 355, which may indicate likelihoods that one or more words will occur in the current context. The language model 350 can be a model that has been trained to estimate the likelihood of a word or phrase occurring based on scores for linguistic and/or non-linguistic features. For example, the language model 350 can determine a posterior probability of a current word, e.g., the first word of the utterance 304, given information about the context for the utterance 304, which may include linguistic context, e.g., the prior words "Let's meet at the," and/or non-linguistic context, e.g., location, device state, application, user characteristics, etc. The feature scores 345 are determined in stage (D) for the features that the language model 350 was trained to be able to process and use to determine word likelihoods.

The language model 350 may include a set of internal weights that represent the training state of the language model 350. These weights may indicate how various aspects of context make words more or less likely to occur. Typically, the weights in the language model 350 are set during training of the language model 350 and do not change during use of the language model. However, the weights are trained using examples of input from a variety of different users and different environments, so the language model 350 is able to estimate likelihoods of words occurring given many different types of linguistic and non-linguistic contexts.

In some implementations, the language model 350 is a log-linear model. Log-linear models may effectively take into account scores from large numbers of features and scores for features of multiple different types. For example, a log-linear model may be used to combine word n-gram feature scores with feature scores indicating physical environment, user characteristics, and other factors. In some implementations, log-linear models may provide greater efficiency or smaller storage requirements than, for example, hidden Markov models (HMMs) or other statistical models.

In some implementations, the language model 350 may be a log-linear model or other maximum entropy model. Other types of models and other training techniques may additionally or alternatively be used. For example, support vector machines, neural networks, classifiers, and other types of models may be used to process various contextual features, including linguistic feature scores, non-linguistic feature scores, and/or other types of information. As an example, an integrated circuit or other device could implement a neural network to serve as a language model. As another example, a set of multiple classifiers could each be trained to process one or more feature scores, and a system could combine the outputs of the classifiers to indicate a probability of occurrence of a word or other lexical item. In general, any appropriate model may be used, where the model receives values for contextual features and provides output indicative of a likelihood of occurrence of a word based on the received values.

The output values 355 provided by the language model 350 may be, for example, scores indicating likelihoods of occurrence of different words given the context indicated by the feature scores 345. For example, the language model 350 may indicate a posterior probability $P(y|X)$, or values from which the probability may be determined, where y represents a lexical item, such as a word, number, URL, or other lexical item, and X is a vector including the feature scores 345.

In some implementations, the language model 350 may be used to obtain a score for each of multiple different words within a particular candidate transcription. For example, the techniques described above can be used to determine an output of the language model 350 for a first word of a candidate transcription. Then, using an assumption that the first word of the candidate transcription is correct, the same techniques may be used to determine an output of the language model 350 for the second word in the candidate transcription. For this second word, the linguistic context has changed, e.g., by the inclusion of the first word of the candidate transcription. To reflect the updated linguistic context, the computing system 320 may use the feature extraction module 340 to determine a new set of feature scores that are appropriate for the new context. In this manner, the computing system 320 may use the language model 350 to determine a score for each of the words in each of the candidate transcriptions 335, based on the particular sequence of words that each word follows.

During stage (F), the computing system 320 uses a re-scoring module 360 to determine scores 365 for the different candidate transcriptions 335. If a candidate transcription includes multiple words, the outputs from the language model 350 for each of the different words of the candidate transcription can be used by the re-scoring module 360 to determine a score 365 indicating a likelihood of occurrence of each candidate transcription as a whole, given the context in which the utterance was spoken.

During stage (G), the computing system 320 selects a transcription for the utterance 304 based on the scores 365. For example, the computing system 320 may select the candidate transcription 335 having the score 365 that indicates the highest likelihood of occurrence.

During stage (H), the computing system 320 provides the selected transcription to the client device 302. The client device 302 may insert the transcription in the application that is running, to complete the user's intended phrase, "Let's meet at the beach."

In the example shown in FIG. 3, non-linguistic context data is used to re-score candidate transcriptions 335 that were determined without taking into account non-linguistic context data. In some implementations, the speech recognizer 330 may use a language model, such as the language model 350, that uses non-linguistic context data to select and rank the candidate transcriptions. In these implementations, a separate re-scoring process may not be needed.

In some implementations, the input to the language model 350 may include only feature scores for non-linguistic features. In other implementations, feature scores may be provided for both linguistic and non-linguistic features. In some implementations, a language model that determines likelihoods using both linguistic and non-linguistic features may have better accuracy than a language model that provides scores based on only linguistic features or only non-linguistic features.

In some implementations, the backoff features may include backoff features corresponding to elements of non-linguistic context. For example, some standard features or n-gram features may represent the occurrence of a word or other outcome with a context that includes a particular time, e.g., time of day, day of the week, date, year, etc., or range of time, a particular geographical location, e.g., country, state, city, zip code, etc., or a particular user characteristic, e.g., a user's gender, age, educational level, primary language spoken, etc. A feature may be defined with respect to multiple different types of context, e.g., "<user=male; city=Los Angeles; day=Saturday; weather>" to represent a male user in Los Angeles using the word "weather" on a Saturday.

Examples include features representing the occurrence of specific words in different cities, such as features (i) "<city=Philadelphia; cheese steak>" representing the phrase "cheese steak" being used in Philadelphia, and (ii) "<city=New York City; cheesecake>" representing the word "cheesecake" being used in New York City. For this example, backoff features may be used to represent the occurrence of a city and word combination that has no specific feature in the model 350. For example, backoff feature "<city=Philadelphia; backoff-1>" can correspond to the occurrence of any word at the location of Philadelphia, where the model 350 does not have a feature for that word in Philadelphia. In addition, or as an alternative, a backoff feature may represent any of multiple cities, e.g., "<city_backoff; cheese steak>", which can represent the occurrence of the term "cheese steak" in an unknown city or any city that does not have a specific feature in the model 350 for the occurrence of "cheese steak" in that city. Further backoffs can be defined, such as "<city_backoff; cheese backoff-1>" or "<city_backoff; backoff-2>," with each feature represents different combinations of words and cities.

As another example, features of a model may ask a question about the domain of the input. For example, the feature may include a component indicating whether the input was entered for a particular domain. Examples of different domains may be different types of searches, e.g., web search, image search, movie library search, etc. As additional examples, different domains may represent different categories of applications or tasks, e.g., voice search, e-mail, shopping, voice commands, navigation, and so on. Features may represent a question as to whether a specific word or phrase occurs in a specific domain, e.g., "<domain=VoiceSearch; who>" which calls for a binary input indicating whether the word "who" occurred in the context of a voice search domain. Backoff features can correspond to instances where a combination of words or phrases with a domain does not have a corresponding feature in the model, e.g., "<domain_backoff; who>" or "<domain_backoff; main street>." For example, if a user speaks the word "who" for a navigation application, and there is no corresponding feature for that word in that specific context, the backoff feature "<domain_backoff; who>" can be activated. This indicates that, the domain component had to be omitted or backed off since the combination did not have a corresponding feature in the model.

In some implementations, the language model 350 may indicate the likelihood of occurrence of sequences of language units other than words. For example, the language model 350 may predict n-grams of characters, phonemes, or other language units. In such implementations, the language model 350 has n-gram features and backoff features based on for n-grams of the type of language unit used. For example, when the language units for a language model are phonemes, each n-gram feature represents a specific n-gram of phonemes, and each backoff feature represents a set of n-grams that include the same number of phonemes (e.g., the same order or n-gram length) and that do not have a corresponding n-gram feature in the model 350.

Figure 4:
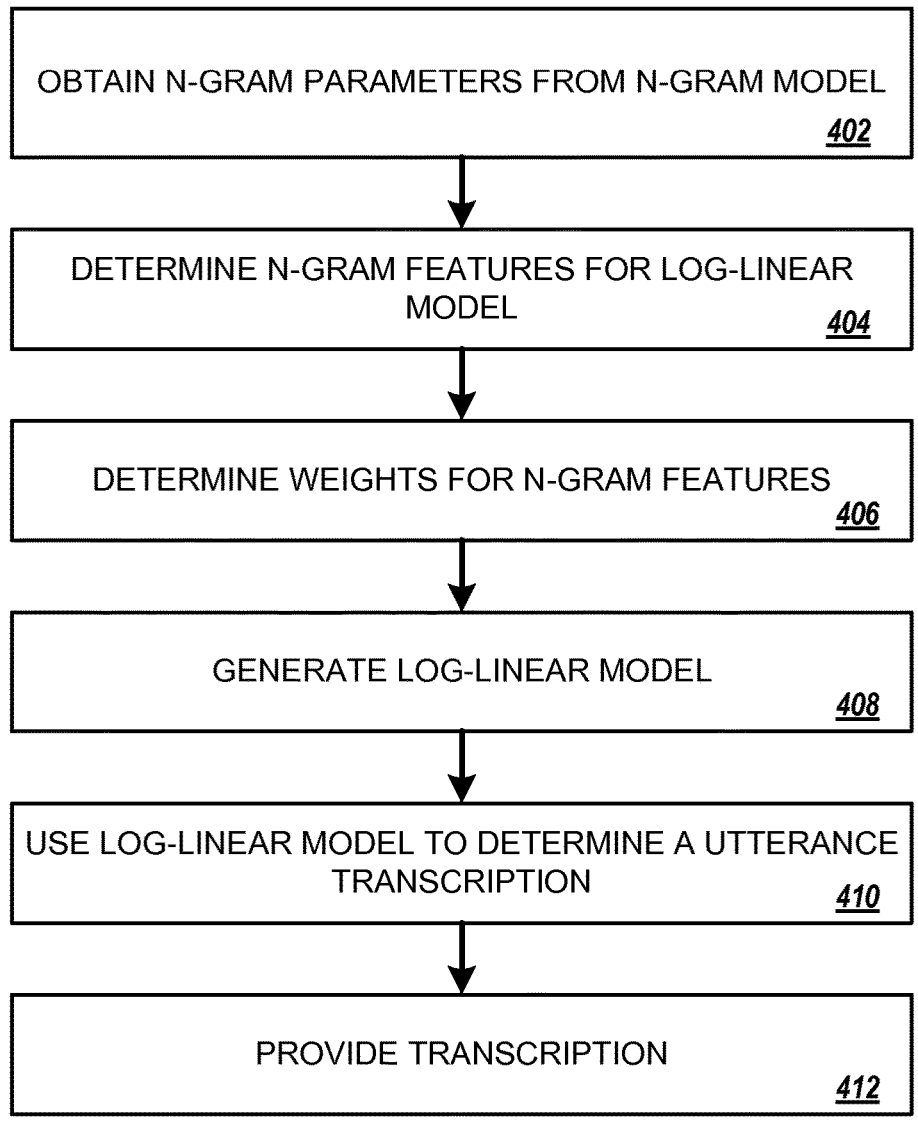
FIG. 4 is a flow diagram that illustrates an example of a process for generating a log-linear language model based on an n-gram model.

FIG. 4 is a flow diagram that illustrates an example of a process 400 for generating a log-linear language model based on an n-gram model. The process 400 may be performed by one or more systems, such as the computing system 100, the computing system 200, or the computing system 320.

The system obtains n-gram parameter values derived from an n-gram language model, where the n-gram parameter values include n-gram parameter values for n-grams that include multiple words (402). For example, the n-gram parameters 110 in FIG. 1 include parameter values for respective n-grams in an n-gram model. In some implementations, for each of the n-grams that includes multiple words, the corresponding parameter value may indicate a conditional probability of an occurrence of a last word in the n-gram given an occurrence of one or more words that precede the last word in the n-gram. For example, the n-gram parameters 110 in FIG. 1 represents the probability that a user has spoken the word "$x_n$" given that the user has spoken the words "$x_1 \ldots x_{n-1}$" in the n-gram X, as described in Equation (10).

In some implementations, the n-gram language model may be configured to assign, to an n-gram that does not have a corresponding parameter value in the n-gram language model, a score based on a parameter value in the n-gram language model for a sub-sequence of words within the n-gram. For example, the n-gram model in FIG. 1 includes backoff parameters 120 that are used to calculate a parameter value (e.g., P("truck"|"I have a") in Equation (11)) for an n-gram that is not in the n-gram model (e.g., "I have a truck").

The system determines n-gram features for a log-linear language model based on the n-grams corresponding to the obtained n-gram parameter values (404). For example, the system 100 in FIG. 1 may determine the n-gram features 130 based on the n-grams in the n-gram model. In some implementations, for each n-gram parameter in the n-gram language model, the system may determine an n-gram feature that represents an occurrence of a particular word in a particular context comprising one or more words. For example, in FIG. 1, the n-gram feature 130a <"I have a", "car"> represents an occurrence of the word "car" in the particular context "I have a".

In some implementations, the system may identify each of the n-grams corresponding to the n-gram parameter values derived from the n-gram language model. The system may then determine the n-gram features to include a feature corresponding to each identified n-gram. For example, the computing system 100 in FIG. 1 may identify a four-gram "I have a car", trigrams "I have a" and "have a car", bigrams "I have", "have a", "a car", and unigrams "I", "have", "a", and "car" from the four-gram "I have a car" in the n-gram model.

The system determines a weight for each of the determined n-gram features (406). For example, the computing system 100 may determine n-gram weights 150 corresponding to the n-gram features 130. In some implementations, for at least some of the n-gram feature, the weight is respectively determined based on (i) an n-gram parameter value that is derived from the n-gram language model and that corresponds to a particular n-gram of multiple words, and (ii) an n-gram parameter value that is derived from the n-gram language model and that corresponds to an n-gram that is a sub-sequence within the particular n-gram. For example, the computing system 100 may initialize $w_{c4}$ 150a of the log-linear model based on the n-gram parameter 110a from the n-gram model as formulated in Equation (14).

The system generates a log-linear language model (408). In some implementations, the log-linear language model has the determined n-gram features, and the determined n-gram features in the log-linear language model having weights that are initialized based on the determined weights. For example, the computing system 100 in FIG. 1 may generate a log-linear model based on n-gram features 130 and n-gram weights 150. In some implementations, the log-linear language model may be generated to indicate, for one or more n-grams, likelihoods of occurrence that equal to likelihoods of occurrence indicated by the n-gram language model for the one or more n-grams. For example, referring to Equation (18), by summing the weights 150a to 150d associated with n-gram features 130a to 130d, most of the terms in the weights cancel with each other, and the probability determined by the log-linear model correlates to the probability determined by the n-gram model (e.g., element 110a) scaled by a normalization factor.

In some implementations, the system may obtain backoff parameter values derived from the n-gram language model, the backoff parameter values representing n-gram backoffs from one order of n-gram to a lower order of n-gram. For example, the computing system 100 in FIG. 1 may obtain backoff parameters 120 derived from the n-gram model. The system may determine backoff features for the log-linear language model that represent the backoffs of the n-grams in the n-gram language model. For example, the computing system 100 may determine backoff features 140 for the log-linear model. The system may determine a weight for each backoff feature in the determined backoff features, wherein each of the weights for the determined backoff features is respectively determined based on a backoff parameter value derived from the n-gram language model. For example, the computing system 100 may determine weights 160 for the backoff features 140 based on the backoff parameters 120 in the n-gram model. The system may generate the log-linear language model to have the backoff features and corresponding weights that are initialized based on the determined weights for the backoff features. For example, the computing system 100 may generate a log-linear model based on backoff features 140 and backoff weights 160 in addition to n-gram features 130 and n-gram weights 150. In some implementations, the weights for the backoff features in the log-linear language model each represents a probability adjustment equivalent to the adjustment represented by a corresponding backoff parameter value in the n-gram language model. For example, referring to Equation (12), by summing the weights 152a to 152c associated with n-gram features 132a to 132c and the weight 160a associated with the backoff feature 140a, many terms cancel with each other, and the probability determined by the log-linear model correlates to the probability determined by the n-gram model scaled by a normalization factor.

In some implementations, the system may, for at least some of the weights, incorporate a backoff parameter value from the n-gram language model in the weight determination. For example, the computing system 200 in FIG. 2 may implicitly incorporate a backoff feature in the determination of the n-gram weights 250.

In some implementations, after generating the log-linear language model, the system may train the log-linear language model to adjust the weights. For example, the system may train the log-linear language model using stochastic gradient descent training and using a set of training data that is different from a set of training data used to train the n-gram language model. In some implementations, the system may re-train the weights for the backoff features based on the determined weights for the backoff features. For example, one or more backoff weights of the backoff weights 160 associated with the backoff feature 140 may change after re-training.

In some implementations, the log-linear language model may include non-linguistic features corresponding to one or more aspects of non-linguistic context. For example, the non-linguistic features may include features indicative of a user characteristic, a time, a geographic location, an application, or an input field.

The system uses the log-linear language model to determine a transcription for an utterance (410). For example, the computing system 320 in FIG. 3 may use a log-linear model to transcribe spoken utterances "Let's meet at the beach" from a user of a client device 310. The system provides the transcription for the utterance (412). For example, the computing system 320 in FIG. 3 may provide the transcribed spoken utterances "beach" back to the client device 310.

Figure 5:
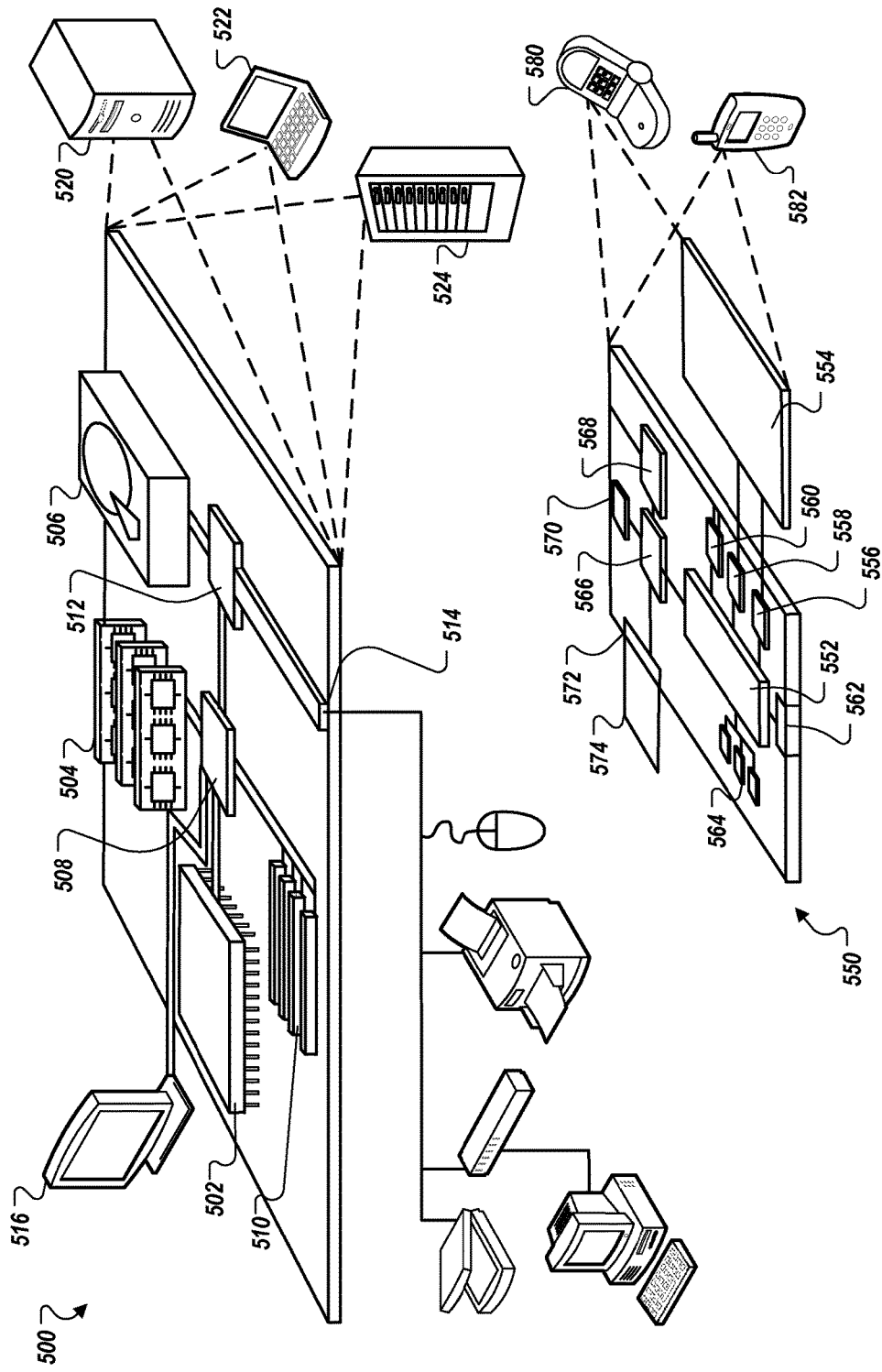
FIG. 5 is a schematic diagram that shows an example of a computing device and a mobile computing device.

FIG. 5 shows an example of a computing device 500 and an example of a mobile computing device 550 that can be used to implement the techniques described above. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, Wi-Fi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, tablet computer, wearable computer, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method performed by one or more computers, the method comprising:

obtaining n-gram parameter values derived from an n-gram language model, the n-gram parameter values including n-gram parameter values for n-grams that include multiple words;

determining n-gram features for a log-linear language model based on the n-grams corresponding to the obtained n-gram parameter values;

determining a weight for each of the determined n-gram features, wherein for at least some of the n-gram features, the weight is determined based on (i) an n-gram parameter value that is derived from the n-gram language model and that corresponds to a particular n-gram of multiple words, and (ii) an n-gram parameter value that is derived from the n-gram language model and that corresponds to an n-gram that is a sub-sequence within the particular n-gram;

generating a log-linear language model having the determined n-gram features, the determined n-gram features in the log-linear language model having weights that are initialized based on the determined weights;

after generating the log-linear language model, training the log-linear language model to adjust the initialized weights;

after training the log-linear language model, using the log-linear language model to determine a transcription for an utterance; and providing the transcription for the utterance.

2. The method of claim 1, wherein the n-gram language model is configured to assign, to an n-gram that does not have a corresponding parameter value in the n-gram language model, a score based on a parameter value in the n-gram language model for a sub-sequence of words within the n-gram.

3. The method of claim 1, wherein, for each of the n-grams that includes multiple words, the corresponding parameter value indicates a conditional probability of an occurrence of a last word in the n-gram given an occurrence of one or more words that precede the last word in the n-gram.

4. The method of claim 1, wherein generating the log-linear language model comprises generating the log-linear language model to indicate, for one or more n-grams, likelihoods of occurrence that equal to likelihoods of occurrence indicated by the n-gram language model for the one or more n-grams.

5. The method of claim 1, wherein determining the n-gram features for the log-linear language model comprises determining, for each n-gram parameter value in the n-gram language model, an n-gram feature that represents an occurrence of a particular word in a particular context comprising one or more words.

6. The method of claim 1, wherein determining the n-gram features for the log-linear language model comprises:

identifying each of the n-grams corresponding to the n-gram parameter values derived from the n-gram language model; and determining the n-gram features to include a feature corresponding to each identified n-gram.

7. The method of claim 1, further comprising:

obtaining backoff parameter values derived from the n-gram language model, the backoff parameter values representing n-gram backoffs from one order of n-gram to a lower order of n-gram;

determining backoff features for the log-linear language model that represent the backoffs of the n-grams in the n-gram language model;

determining a weight for each backoff feature in the determined backoff features, wherein each of the weights for the determined backoff features is respectively determined based on a backoff parameter value derived from the n-gram language model; and wherein generating the log-linear language model comprises generating the log-linear language model to have the backoff features and corresponding weights that are initialized based on the determined weights for the backoff features.

8. The method of claim 7, wherein the weights for the backoff features in the log-linear language model each represents a probability adjustment equivalent to the adjustment represented by a corresponding backoff parameter value in the n-gram language model.

9. The method of claim 1, wherein determining the weight for each n-gram feature comprises, for at least some of the weights, incorporating a backoff parameter value from the n-gram language model in the weight determination.

10. The method of claim 1, wherein the log-linear language model includes non-linguistic features corresponding to one or more aspects of non-linguistic context, the non-linguistic features including features indicative of a user characteristic, a time, a geographic location, an application, or an input field.

11. The method of claim 1, wherein training the log-linear language model comprises training the log-linear language model using stochastic gradient descent training and using a set of training data that is different from a set of training data used to train the n-gram language model.

12. A system comprising:

one or more computers and one or more storage devices storing instructions that are operable, when executed by the one or more computers, to cause the one or more computers to perform operations comprising:

obtaining n-gram parameter values derived from an n-gram language model, the n-gram parameter values including n-gram parameter values for n-grams that include multiple words;

determining n-gram features for a log-linear language model based on the n-grams corresponding to the obtained n-gram parameter values;

determining a weight for each of the determined n-gram features, wherein for at least some of the n-gram features, the weight is determined based on (i) an n-gram parameter value that is derived from the n-gram language model and that corresponds to a particular n-gram of multiple words, and (ii) an n-gram parameter value that is derived from the n-gram language model and that corresponds to an n-gram that is a sub-sequence within the particular n-gram;

generating a log-linear language model having the determined n-gram features, the determined n-gram features in the log-linear language model having weights that are initialized based on the determined weights;

after generating the log-linear language model, training the log-linear language model to adjust the initialized weights;

after training the log-linear language model, using the log-linear language model to determine a transcription for an utterance; and providing the transcription for the utterance.

13. The system of claim 12, wherein the operations further comprise:

obtaining backoff parameter values derived from the n-gram language model, the backoff parameter values representing n-gram backoffs from one order of n-gram to a lower order of n-gram;

determining backoff features for the log-linear language model that represent the backoffs of the n-grams in the n-gram language model;

determining a weight for each backoff feature in the determined backoff features, wherein each of the weights for the determined backoff features is respectively determined based on a backoff parameter value derived from the n-gram language model; and wherein generating the log-linear language model comprises generating the log-linear language model to have the backoff features and corresponding weights that are initialized based on the determined weights for the backoff features.

14. The system of claim 12, wherein generating the log-linear language model comprises generating the log-linear language model to indicate, for one or more n-grams, likelihoods of occurrence that equal to likelihoods of occurrence indicated by the n-gram language model for the one or more n-grams.

15. The system of claim 12, wherein determining the n-gram features for the log-linear language model comprises determining, for each n-gram parameter value in the n-gram language model, a n-gram feature that represents an occurrence of a particular word in a particular context comprising one or more words.

16. A non-transitory computer-readable medium storing a computer program, the program comprising instructions that when executed by one or more computers cause the one or more computers to perform operations comprising:

obtaining n-gram parameter values derived from an n-gram language model, the n-gram parameter values including n-gram parameter values for n-grams that include multiple words;

determining n-gram features for a log-linear language model based on the n-grams corresponding to the obtained n-gram parameter values;

determining a weight for each of the determined n-gram features, wherein for at least some of the n-gram features, the weight is determined based on (i) an n-gram parameter value that is derived from the n-gram language model and that corresponds to a particular n-gram of multiple words, and (ii) an n-gram parameter value that is derived from the n-gram language model and that corresponds to an n-gram that is a sub-sequence within the particular n-gram;

generating a log-linear language model having the determined n-gram features, the determined n-gram features in the log-linear language model having weights that are initialized based on the determined weights;

using the log-linear language model to determine a transcription for an utterance; and providing the transcription for the utterance.

17. The non-transitory computer-readable medium of claim 16, wherein the operations further comprise:
  obtaining backoff parameter values derived from the n-gram language model, the backoff parameter values representing n-gram backoffs from one order of n-gram to a lower order of n-gram;
  determining backoff features for the log-linear language model that represent the backoffs of the n-grams in the n-gram language model;
  determining a weight for each backoff feature in the determined backoff features, wherein each of the weights for the determined backoff features is respectively determined based on a backoff parameter value derived from the n-gram language model; and
  wherein generating the log-linear language model comprises generating the log-linear language model to have the backoff features and corresponding weights that are initialized based on the determined weights for the backoff features.

18. The non-transitory computer-readable medium of claim 16, wherein generating the log-linear language model comprises generating the log-linear language model to indicate, for one or more n-grams, likelihoods of occurrence that equal to likelihoods of occurrence indicated by the n-gram language model for the one or more n-grams.

19. The method of claim 1, wherein generating the log-linear language model comprises including, in the log-linear language model, features and corresponding weights representing one or more non-linguistic contextual factors;
  wherein training the log-linear language model comprises adjusting the weights based on training data indicating non-linguistic contextual factors.

20. The method of claim 19, wherein the non-linguistic contextual factors comprise a characteristic of at least one of a physical environment, a physical state of a device, an operating state of a device, or a speaker.

* * * * *